(12) United States Patent
Kuhn et al.

(10) Patent No.: US 12,314,308 B2
(45) Date of Patent: May 27, 2025

(54) OUTPUT-BASED ATTRIBUTION FOR CONTENT GENERATED BY AN ARTIFICIAL INTELLIGENCE (AI)

(71) Applicant: Sureel Inc., Pacifica, CA (US)

(72) Inventors: Christopher Benjamin Kuhn, Munich (DE); Tamay Aykut, Pacifica, CA (US)

(73) Assignee: Sureel Inc., Pacifica, CA (US)

( * ) Notice: Subject to any disclaimer, the term of this patent is extended or adjusted under 35 U.S.C. 154(b) by 158 days.

(21) Appl. No.: 18/242,898

(22) Filed: Sep. 6, 2023

(65) Prior Publication Data

US 2024/0419720 A1    Dec. 19, 2024

Related U.S. Application Data

(63) Continuation-in-part of application No. 18/231,551, filed on Aug. 8, 2023.

(60) Provisional application No. 63/521,066, filed on Jun. 14, 2023, provisional application No. 63/422,885, filed on Nov. 4, 2022.

(51) Int. Cl.
| | |
|---|---|
| *G06F 16/45* | (2019.01) |
| *G06F 16/438* | (2019.01) |
| *G06N 3/0455* | (2023.01) |
| *G06N 3/0475* | (2023.01) |
| *G06Q 30/0208* | (2023.01) |

(52) U.S. Cl.
CPC ............ *G06F 16/45* (2019.01); *G06F 16/438* (2019.01); *G06N 3/0455* (2023.01); *G06N 3/0475* (2023.01); *G06Q 30/0208* (2013.01)

(58) Field of Classification Search
CPC .............................. G06F 16/45; G06F 16/438
USPC .......................................................... 707/736
See application file for complete search history.

(56) References Cited

U.S. PATENT DOCUMENTS

| | | | |
|---|---|---|---|
| 7,639,386 B1* | 12/2009 | Siegel | G06Q 40/03 358/1.18 |
| 10,599,770 B1* | 3/2020 | Strope | G06F 40/289 |
| 11,244,032 B1* | 2/2022 | Nguyen | G06F 21/105 |
| 2006/0112098 A1* | 5/2006 | Renshaw | G06F 16/639 |
| 2016/0147864 A1* | 5/2016 | Kane | G06Q 30/0206 707/723 |
| 2017/0220545 A1* | 8/2017 | Gururajan | G06F 40/106 |
| 2022/0043965 A1* | 2/2022 | Dvorak | G06F 40/103 |
| 2022/0350828 A1* | 11/2022 | Ma | G06F 16/3347 |
| 2023/0075884 A1* | 3/2023 | Jakobsson | H04L 9/50 |
| 2023/0252795 A1* | 8/2023 | Tong | G06V 20/58 382/104 |

(Continued)

*Primary Examiner* — Kimberly L Wilson
(74) *Attorney, Agent, or Firm* — Flagship Patents; Shiv S. Naimpally

(57) ABSTRACT

In some aspects, a device may determine an output embedding associated with an output produced by a generative artificial intelligence and determine a distance measurement between the output embedding and individual content-related embeddings of a plurality of content-related embeddings to create a plurality of distance measurements. The device may correlate the plurality of distance measurements to a plurality of content creators that created multiple content items used to train the generative artificial intelligence to determine one or more creator attributions. The device may determine a creator attribution vector that includes the one or more creator attributions and initiate providing compensation to one or more content creators of the plurality of content creators.

20 Claims, 10 Drawing Sheets

(56) References Cited

U.S. PATENT DOCUMENTS

| | | | |
|---|---|---|---|
| 2023/0343008 A1* | 10/2023 | Do | G06V 10/82 |
| 2023/0360300 A1* | 11/2023 | De Brouwer | G06N 3/084 |
| 2023/0401550 A1* | 12/2023 | Mikolajczuk | G06Q 20/123 |
| 2024/0147025 A1* | 5/2024 | Graciarena | H04N 21/814 |
| 2024/0370804 A1* | 11/2024 | Wolochow | G06Q 50/205 |

* cited by examiner

OUTPUT-BASED ATTRIBUTION FOR CONTENT GENERATED BY AN ARTIFICIAL INTELLIGENCE (AI)

CROSS-REFERENCE TO RELATED APPLICATIONS

The present non-provisional patent application claims priority from (1) U.S. Provisional Application 63/521,066 filed on Jun. 14, 2023, (2) Provisional Application 63/422,885 filed on Nov. 4, 2022, and (3) U.S. patent application Ser. No. 18/231,551 filed on Aug. 8, 2023, all of which are incorporated herein by reference in their entirety and for all purposes as if completely and fully set forth herein.

BACKGROUND OF THE INVENTION

Field of the Invention

This invention relates generally to systems and techniques to determine the proportion of content items used by a generative artificial intelligence (e.g., Latent Diffusion Model or similar) to generate derivative content, thereby enabling attribution (and compensation) to content creators that created the content items used to generate the derivative content.

Description of the Related Art

Generative artificial intelligence (AI) enables anyone (including non-content creators) to instruct the AI to create derivative content that is similar to (e.g., shares one or more characteristics with) (1) content that was used to train the AI, (2) content used by the AI to create the new content, or (3) both. For example, if someone requests that the AI generate an image of a particular animal (e.g., a tiger) in the style of a particular artist (e.g., Picasso), then the AI may generate derivative content based on (1) drawings and/or photographs of the particular animal and (2) drawings of the particular artist. Currently, there is no means of determining the proportionality of the content that the AI used to generate the derivative content and therefore no mechanism to provide attribution (and compensation) to the content creators that created the content used by the AI to generate the derivative content.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some aspects, a device may determine an output embedding associated with an output produced by a generative artificial intelligence and determine a distance measurement (e.g., expressing a similarity or proximity) between the output embedding and individual content-related embeddings of a plurality of content-related embeddings to create a plurality of distance measurements. The device may correlate the plurality of distance measurements to a plurality of content creators that created multiple content items used to train the generative artificial intelligence to determine one or more creator attributions. The device may determine a creator attribution vector that includes the one or more creator attributions and initiate providing compensation to one or more content creators of the plurality of content creators.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1:
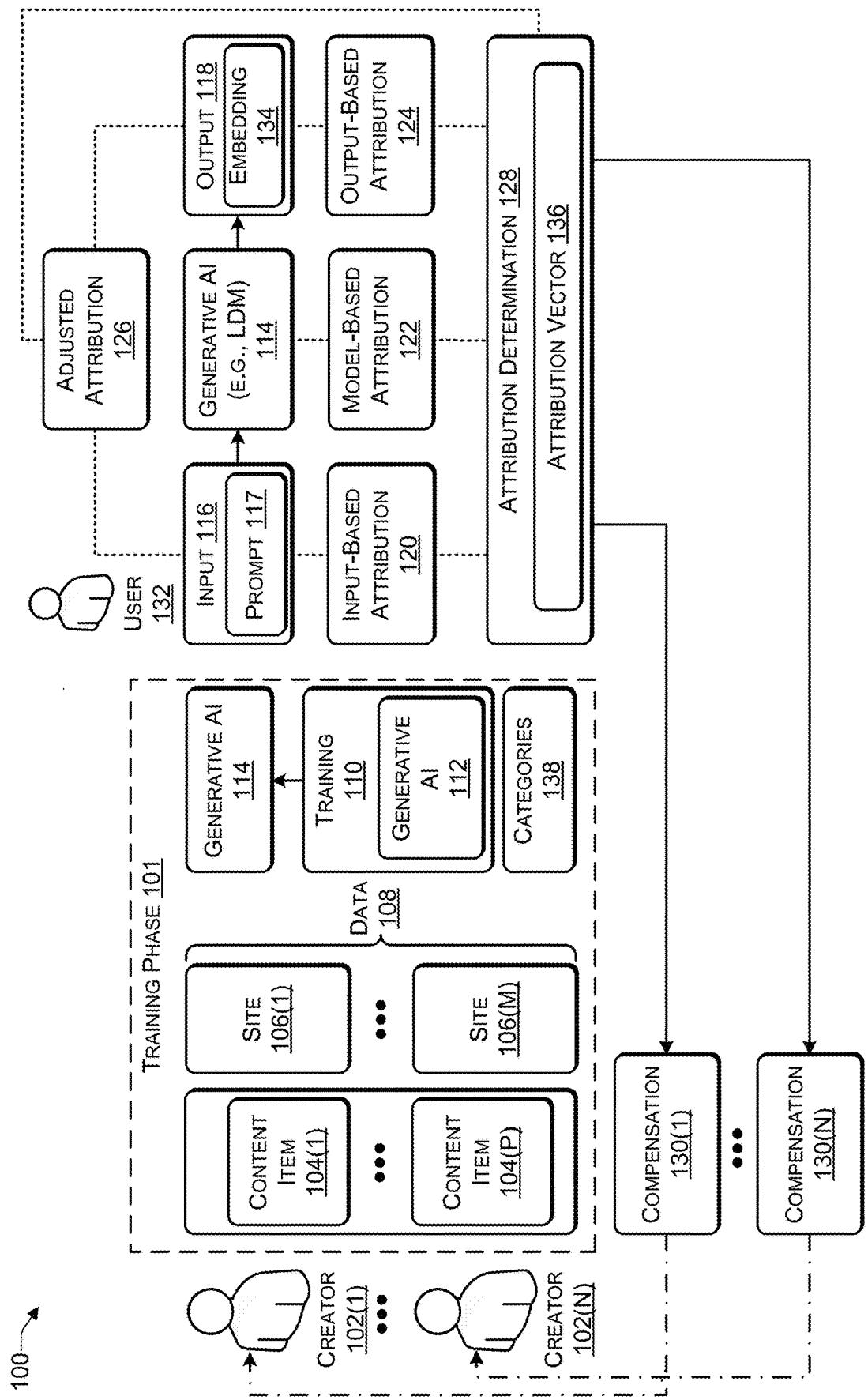
FIG. 1 is a block diagram of a system illustrating different ways to determine a attribution of an output produced by a generative artificial intelligence (AI), according to some embodiments.

With conventional art (e.g., paintings), the term provenance refers to authenticating a work of art by establishing the history of ownership. More broadly, provenance is a set of facts that link the work of art to its creator and explicitly describe the work of art including, for example, a title of the work of art, a name of the creator (e.g., artist), a date of creation, medium (e.g., oil, watercolor, or the like), dimensions, and the like. Generative artificial intelligence (AI), implemented using, for example, a diffusion model or similar AI, may be used to generate digital content. For example, a user (e.g., a secondary creator) may input a text description of the desired digital content to the AI and the AI may generate an output. To illustrate, the input "create a painting of a lion in the style of Picasso" may result in the generative AI creating a digital image that is derived from a photograph or painting of a lion and from the paintings of artist Pablo Picasso. The term provenance, as used herein, is with reference to digital content generated by an AI and includes attribution to one or more content creators (e.g., Picasso).

Terminology

Creator refers to a provider of original content ("content provider"), e.g., content used to train (e.g., fine tune or further train) the generative AI to encourage an "opt-in" mentality. By opting in to allow their original content to be used to train and/or re-train the generative AI, each of the creators receive attribution (and possibly compensation) for derivative content created by the generative AI that has been influenced by the original content of the creators.

User (e.g., a secondary creator) refers to an end user of the generative AI that generates derivative content using the generative AI.

Category refers to various characteristics of a content item, either original content or derivative content. For example, categories associated with a work of art may include (1) material applied to a medium, such as pencil (color or monochrome), oil, watercolor, charcoal, mixed materials, or the like, (2) the medium, such as paper, canvas, wood, or the like, (3) the instrument used to apply the material to the medium, such as a brush, a finger, a palette knife, or the like, (4) style, such as renaissance, modern, romanticism, neo-classical, hyper-realism, pop art, or the like, and so on.

Embedding refers to a matrix (or a vector) of numbers. An embedding may be used to describe something in terms of other things. For example, derivative content created by a generative AI may include an output embedding that describes the output in terms of creators, content items, categories (e.g., characteristics), or any combination thereof.

The systems and techniques described herein may be applied to any type of generative AI models, including (but not limited to) diffusion models, generative adversarial network (GAN) models, Generative Pre-Trained Transformer (GPT) models, or other types of generative AI models. For illustration purposes, a diffusion model is used as an example of a generative AI. However, it should be understood that the systems and techniques described herein may be applied to other types of generative AI models. A diffusion model is a generative model used to output (e.g., generate) data similar to the training data used to train the generative model. A diffusion model works by destroying training data through the successive addition of Gaussian noise, and then learns to recover the data by reversing the noise process. After training, the diffusion model may generate data by passing randomly sampled noise through the learned denoising process. In technical terms, a diffusion model is a latent variable model which maps to the latent space using a fixed Markov chain. This chain gradually adds noise to the data in order to obtain the approximate posterior q (x1: T|x0), where x1, . . . , xT are latent variables with the same dimensions as x0.

A latent diffusion model (LDM) is a specific type of diffusion model that uses an auto-encoder to map between image space and latent space. The diffusion model works on the latent space, making it easier to train. The LDM includes (1) an auto-encoder, (2) a U-net with attention, and (3) a Contrastive Language Image Pretraining (CLIP) embeddings generator. The auto-encoder maps between image space and latent space. In terms of image segmentation, attention refers to highlighting relevant activations during training. By doing this, computational resources are not wasted on irrelevant activations, thereby providing the network with better generalization power. In this way, the network is able to pay "attention" to certain parts of the image. A CLIP encoder may be used for a range of visual tasks, including classification, detection, captioning, and image manipulation. A CLIP encoder may capture semantic information about input observations. CLIP is an efficient method of image representation learning that uses natural language supervision. CLIP jointly trains an image encoder and a text encoder to predict the correct pairings of a batch of (image, text) training examples. The trained text encoder synthesizes a zero-shot linear classifier by embedding the names or descriptions of the target dataset's classes. For pre-training, CLIP is trained to predict which possible (image, text) pairings actually occurred. CLIP learns a multi-modal embedding space by jointly training an image encoder and text encoder to maximize the cosine similarity of the image and text embeddings of the real pairs in the batch while minimizing the cosine similarity of the embeddings of the incorrect pairings.

As a first example, a method includes: determining, by one or more processors, an output embedding associated with an output produced by a generative artificial intelligence; determining, by the one or more processors, a distance measurement between the output embedding and individual content-related embeddings of a plurality of content-related embeddings to create a plurality of distance measurements; correlating, by the one or more processors, the plurality of distance measurements to a plurality of content creators that created multiple content items used to train the generative artificial intelligence; determining, by the one or more processors and based on the correlating, one or more creator attributions; determining, by the one or more processors, a creator attribution vector that includes the one or more creator attributions; and initiating, by the one or more processors, providing compensation to one or more content creators of the plurality of content creators based on the creator attribution vector. The plurality of content-related embeddings may include: a plurality of creator embeddings, wherein individual creator embeddings of the plurality of creator embeddings correspond to individual content creators of the plurality of content creators. The method may include: selecting a particular creator of the one or more content creators; performing, using a neural network (or another type of AI), an analysis of a set of content items created by the particular creator; determining, based on the analysis, a plurality of captions describing the set of content items; creating, based on the plurality of captions, a particular creator description; and creating a creator embedding based on the particular creator description. The one or more creators may include: (i) one or more artists, (ii) one or more authors, (iii) one or more musicians, (iv) one or more visual content creators, or (v) any combination thereof. The output produced by the generative artificial intelligence may include: a digital image having an appearance of a work of art; a digital visual image; a digital text-based book; a digital music composition; a digital video; or any combination thereof. The distance measurement may include: a cosine similarity, a contrastive learning encoding distance; a simple matching coefficient, a Hamming distance, a Jaccard index, an Orchini similarity, a Sorensen-Dice coefficient, a Tanimoto distance, a Tucker coefficient of congruence, a Tversky index, or any combination thereof.

As a second example, a server includes: one or more processors and a non-transitory memory device to store instructions executable by the one or more processors to perform various operations. The operations include: determining an output embedding associated with an output produced by a generative artificial intelligence; determining a distance measurement between the output embedding and individual content-related embeddings of a plurality of content-related embeddings to create a plurality of distance measurements; correlating the plurality of distance measurements to a plurality of content creators that created multiple content items used to train the generative artificial intelligence; determining, based on the correlating, one or more creator attributions; determining a creator attribution vector that includes the one or more creator attributions; and initiating providing compensation to one or more content creators of the plurality of content creators based on the creator attribution vector. The plurality of content-related embeddings may include: a plurality of content item embeddings, wherein individual content item embeddings of the plurality of content item embeddings correspond to individual content items of the multiple content items. The operations may include: selecting a particular creator of the one or more content creators; performing, using a neural network (or another type of AI), an analysis of a set of content items created by the particular creator; determining, based on the analysis, a plurality of captions describing the set of content items; and creating, based on the plurality of captions, a content item embedding corresponding to individual content items of the multiple content items. For example, the generative artificial intelligence may include: a latent diffusion model; a generative adversarial network; a generative pre-trained transformer; a variational autoencoder; a multimodal model; or any combination thereof. The one or more content creators may include: one or more artists, one or more authors, one or more musicians, one or more songwriters, one or more visual content creators, or any combination thereof. The output produced by the generative artificial intelligence may include: a digital image having an appearance of a work of art; a digital visual image; a digital text-based book; a digital music composition; a digital video; or any combination thereof. The distance measurement may include: a cosine similarity, a contrastive learning encoding distance, a simple matching coefficient, a Hamming distance, a Jaccard index, an Orchini similarity, a Sorensen-Dice coefficient, a Tanimoto distance, Tucker coefficient of congruence, a Tversky index, or any combination thereof.

As a third example, a non-transitory computer-readable memory device may store instructions executable by one or more processors to perform various operations. The operations include: determining an output embedding associated with an output produced by a generative artificial intelligence; determining a distance measurement between the output embedding and individual content-related embeddings of a plurality of content-related embeddings to create a plurality of distance measurements; correlating the plurality of distance measurements to a plurality of content creators that created multiple content items used to train the generative artificial intelligence; determining, based on the correlating, one or more creator attributions; determining a creator attribution vector that includes the one or more creator attributions; and initiating providing compensation to one or more content creators of the plurality of content creators based on the creator attribution vector. The plurality of content-related embeddings may include: a plurality of category embeddings, wherein individual category embeddings of the plurality of category embeddings correspond to individual content items of the multiple content items. The operations may further include: determining, for individual content items of the multiple content items, a category embedding identifying one or more categories associated with individual content items. The generative artificial intelligence may include: a latent diffusion model; a generative adversarial network; a generative pre-trained transformer; a variational autoencoder; a multimodal model; or any combination thereof. The content may include a digital image having an appearance of a work of art and the one or more creators may include one or more artists. The content may include a digital book and the one or more creators may include one or more authors. The content may include a digital music composition and the one or more creators may include one or more musicians, one or more songwriters, or any combination thereof.

FIG. 1 is a block diagram of a system 100 illustrating different ways to determine attribution of an output produced by a generative artificial intelligence (AI), according to some embodiments. Before a generative AI is deployed, the generative AI undergoes a training phase 101 in which the generative AI is trained to produce a particular type of content. Typically, a generative AI comes pre-trained and then may undergoes further training with a particular type of content (e.g., digital image, music, text-based fiction book, or the like) to enable the generative AI to generate the particular type of content.

Multiple creators 102(1) to 102(N) (N>0) may create content items 104(1) to 104(P) (P>0). The content items 104 may include, for example, digital artwork (including original digital artwork and original artwork that has been digitized), digital images (e.g., photographs), digital music, digital text-based content (e.g., eBooks), digital video, another type of digital content, or any combination thereof. In some cases, at least a portion of the content items 104 may be accessible via one or more sites 106(1) to 106(M) (M>0). For example, the creators 102 may upload one or more of the content items 104 to one or more of the sites 106 to make the content items 104 available for acquisition (e.g., purchase, lease, or the like). The content items 104 may be copied (e.g., via a web crawler or the like) from the sites 106 or links obtained and used as training data 108 to perform training 110 of a generative artificial intelligence 112 to create a generative AI 114 (e.g., trained). The generative AI 114 may be a latent diffusion model or another type of generative AI. A generative AI, such as the AI 112, typically comes pre-trained (e.g., using open-source data), after which further training (the training 110) is performed to create the generative AI 114. For example, when the training 110 uses data 108 that includes images of paintings, then the pre-trained AI 112 may be trained to generate images of paintings, when the training 110 uses rhythm and blues songs, then the pre-trained AI 112 may be trained to create the AI 114 that generates rhythm and blues songs, when the training 110 uses science fiction novels, then the pre-trained AI 112 may be trained to create the AI 114 that generates science fiction novels, and so on. To illustrate, the AI 112 may be a pre-trained model $SD_{BASE}$, such as LAION (Large-scale Artificial Intelligence Open Network or another generative AI model) that is trained using open-source datasets. Using the content items 104, the model $SD_{BASE}$ is tuned to create the generative AI 114, e.g., $SD_{TUNED}$. For example, the generative AI 114 may be tuned to generate a particular type of derivative content, such as, for example, digital images of artwork, digital images of photos, digital music in a particular style, or the like. During the training phase 101, categories 138 associated with the training data 108 (e.g., the content items 104) may be identified. For example, for artwork, the categories 138 may identify the main colors (e.g., red, blue, green, and the like) present in the training data 108, the high-level content (e.g., portrait, landscape, or the like) present in the training data 108, the content details (e.g., human, animal, furniture, jewelry, waterfall, river, ocean, mountain(s), or the like) present in the training data 108, the style (renaissance, modern, romanticism, neo-classical, hyper-realism, pop art, or the like) in the training data 108, and so on.

After the generative AI 114 has been created via the training 110, a user, such as a representative user 132 (e.g., a secondary creator), may use the generative AI 114 to generate derivative content, such as output 118. For example, the representative user 132 may provide input 116, such as input, e.g., "create <content type> <content description> similar to <creator identifier>". In this example, <content type> may include digital art, digital music, digital text, digital video, another type of content, or any combination thereof. The <content description> may include, for example, "a portrait of a woman with a pearl necklace", "a rhythm and blues song", "a science fiction novel", "an action movie", another type of content description, or any combination thereof. The <creator identifier> may include, for example, "Vermeer" (e.g., for digital art), "Aretha Franklin" (e.g., for digital music), "Isaac Asimov" (e.g., for science fiction novel), "James Cameron" (e.g., for action movie), or the like. The input 116 may be text-based input, one or more images (e.g., drawings, photos, or other types of images), or input provided using one or more user-selectable settings.

Based on the input 116, the generative AI 114 may produce the output 118. For example, the output 118 may include digital art that includes a portrait of a woman with a pearl necklace in the style of Vermeer, digital music that includes a rhythm and blues song in the style of Aretha Franklin, a digital book that includes a science fiction novel in the style of Isaac Asimov, a digital video that includes an action movie in the style of James Cameron, and so on. The input 116 may be converted into an embedding to enable the generative AI 114 to understand and process the input 116.

Attribution for the derivative content in the output 118 may be performed in one of several ways. Input-based attribution 120 involves analyzing the input 116 to determine the attribution of the output 118. Model-based attribution 122 may create an attribution vector 136 that specifies a percentage of influence that each content item, content creator, and/or category had in the training of the generative AI 114. For example:

$$\text{Vector } 136 = \{SC1, SC2, \ldots SCn\}$$

where $SC_i$ ($0<i<=n$) is a distance (e.g., similarity) of the content created by Creator $102(i)$ to the output 118 determined based on an analysis of the input 116. A distance between two items, such as a generated item and a content item, is a measure of a difference between the two items. As distance decreases, similarity between two items increases and as distance increases, similarity between two items decreases. For example, if a distance d between two items I1 and I2 is less than or equal to a threshold T, then the items are considered similar and if d>T, then the items are considered dissimilar. Output-based attribution 124 involves analyzing the output 118 to determine the main X (X>0) influences that went into the output 118. Adjusted attribution 126 involves manual fine tuning of the generative process by specifying a desired degree of influence for each content item, creator, pool, category (e.g., the data 108) that the generative AI 114 was trained on. Adjusted attribution 126 enables the user 132 to adjust the output 118 by modifying an amount of influence provided by individual content item, creators, categories, and the like. For example, adjusted attribution 126 enables the user 132 to increase the influence of creator 102(N), which causes the generative AI 114 to generate the output 118 that includes content with a greater amount of content associated with creator 102(N).

One or more of: (i) the input-based attribution 120, (ii) the model-based attribution 122, (iii) the output-based attribution 124, (iv) the adjusted attribution 126, or (v) any combination thereof may be used by an attribution determination module 128 to determine an attribution for the content creators 102 that influenced the output 118. In some cases, the attribution determination 128 may use a threshold to determine how many of the creators 102 are to be attributed. For example, the attribution determination 128 may use the top X (X>0), such as the top five, top 8, top 10, or the like influences, to determine which of the creators 102 influenced the output 118 and are to be attributed. As another example, the attribution determination 128 may identify one or more of the creators 102 that contributed at least a threshold amount, e.g., Y %, such as 5%, 10%, or the like. In this way, if the influence of a particular creator 102 is relatively small (e.g., less than a threshold amount), then the particular creator 102 may not receive attribution. The attribution determination module 128 may determine attribution that is used to provide compensation 130 to one or more of the creators 102. For example, attribution determination module 128 may determine that a first creator 102 is to be attributed 40%, a second creator 102 is to be attributed 30%, a third creator 102 is to be attributed 20%, and a fourth creator is to be attributed 10%. The compensation 130 provided to one or more of the creators 102 may be based on the attribution determination. For example, the compensation 130 may include providing a statement accompanying the output 118 identifying the attribution ("this drawing is influenced by Vermeer", "this song is influenced by Aretha", "this novel is influenced by Asimov", and so on), compensation (e.g., monetary or another type of compensation), or another method of compensating a portion of the creators 102 whose content items 104 were used to generate the output 118.

The generative AI 114 may be trained using images of a particular person (or a particular object) and used to create new images of that particular person (or particular object) in contexts different from the training images. The generative AI 114 may apply multiple characteristics (e.g., patterns, textures, composition, color-palette, and the like) of multiple style images to create the output 118. The generative AI 114 may apply a style that is comprehensive and includes, for example, categories (e.g., characteristics) such as patterns, textures, composition, color-palette, along with an artistic expression (e.g., of one or more of the creators 102) and intended message/mood (as specified in the input 116) of multiple style images (from the training data 108) onto a single content image (e.g., the output 118). Application of a style learned using private content (e.g., provided by the user 132) may be expressed in the output 118 based on the text included in the input 116. In some cases, the output 118 may include captions that are automatically generated by the generative AI 114 using a machine learning model, such as Contrastive Language-Image Pre-Training (CLIP), if human-written captions are unavailable. In some cases, the user 132 (e.g., secondary creator) may instruct the generative AI 114 to produce a 'background' of an image based on a comprehensive machine-learning-based understanding of the background of multiple training images to enable the background to be set to a transparent layer or to a user-selected color. The generative AI 114 may be periodically retrained to add new creators, to add new content items of creators previously used to train the generative AI 114, and so on.

The output 118 may include an embedding 134 (created using an encoder, such as a transformer). The embedding 134 may be a set of numbers, arranged in the form of a matrix (or a one-dimensional matrix, which is sometimes referred to as a vector). Each component of the vector (or matrix) may identify a particular category (e.g., characteristic) expressed in the input 116. To illustrate, a first component of the vector may specify a content type (e.g., digital image, digital music, digital book, or the like), a second component may specify a creator style (e.g., Picasso, Rembrandt, Vermeer, or the like), a third component may specify a painting style (e.g., impressionist, realist, or the like), a fourth component specify a component of the output (e.g., man, woman, type of animal, or the like), and so on. The output 118 may be relatively high resolution. For example, for digital audio, the resolution may be 16 bit or 24 bit sampling at 44 Kilohertz (kHz), 96 kHz, or 192 kHz sampling rate, digital stream direct (DSD) at 2.8224 MegaHertz (MHz), or higher. As a further example, for digital video, the resolution may be 1080p (1 k), 4 k, 8 k, or higher. As another example, for digital images, the resolution may be 512 pixels (px), 768 px, 2048 px, 3072 px, or higher and may be square or non-square (e.g., rectangular). To illustrate, the user 132 may specify in the input 116 as a ratio of the length to width of the output 118, such as 3:2, 4:3, 16:9, or the like, the resolution (e.g., in pixels) and other output-related specifications. In some cases, the output 118 may apply a style to videos with localized synthesis restrictions using a prior learned or explicitly supplied style.

The model-based attribution 122 may create the attribution vector 136 for content generation of the generative AI 114, which may be an "off the shelf" LDM or an LDM that has been fine-tuned specifically for a particular customer. The attribution vector 136 specifies the percentage of influence that each content item, creator, pool, category had in the creation of the generative AI 114 (e.g., LDM). The model-based attribution 122 may create an output-based attribution vector for the output 118 with a specific text/as input 116. In some cases, the attribution vector may specify the percentage of influence that each content item, creator, pool, category had in the creation of the output 118 based on the specific text in the input 116.

The input-based attribution 120 may create an input-based attribution vector 136 for a specific output 118, e.g., generated content, that was generated by providing text t as input 116. The attribution vector 136 specifies the percentage of relevance each content item, creator, pool, category has based on the input 116. The input 116 may reveal influences, regardless of the type of generative model used to generate the output 118. The input-based attribution 120 may analyze the input 116 to identify various components that the generative AI 114 uses to create the output 118. First, the input-based attribution 120 may analyze the input 116 to determine creator identifiers (e.g., creator names) that identify one or more of the creators 102. For example, if a particular creator of the creators 102 (e.g., Picasso, Rembrandt, Vermeer, or the like for art) is explicitly specified in the input 116, then the bias of the particular creator is identified by adding the particular creator to the attribution vector 136. Second, the input-based attribution 120 may analyze the input 116 to determine one or more categories, such as specific styles, objects, or concepts, in the input 116. The input-based attribution 120 may determine a particular category in the input 116 and compare the particular category with categories included in descriptions of individual creators 102. To illustrate, if the input 116 has the word "dog" (a type of category), then "dog" (or a broader category, such as "animal") may be used to identify creators 102 (e.g., Albrecht Dürer, Tobias Stranover, Carel Fabritius, or the like) who are described as having created content items 104 that include that type of category (e.g., "dog" or "animal"). To enable such a comparison, a description Dj is created and maintained for each creator Cj, where each description contains up to k (k>0) categories. The description may be supplied by the creator or generated automatically using a machine learning model, such as CLIP, to identify which categories are found in the content items 104 created by the creators 102. The descriptions of creators 102 may be verified (e.g., using a machine learning model) to ensure that the creators 102 do not add categories to their descriptions that do not match their content items 104. Third, the input-based attribution 120 may determine the embedding 134. To generate the output 118 from the input 116, the input 116 (e.g., text t) may be embedded into a shared language-image space using a transformer to create the embedding 134 (Et). The embedding 134 (Et) may be compared to creator-based embeddings ECi to determine the distance (e.g., similarity) of the input 116 to individual creators 102. A distance measurement (e.g., expressing a similarity) may be determined using a distance measure Di, such as cosine similarity, contrastive learning (e.g., self-supervised learning), Orchini similarity, Tucker coefficient of congruence, Jaccard index, Sorensen similarity index, or another type of distance or similarity measure. In some cases, the resulting input-based attribution 120 may be combined with the attribution of the output 118 Ot which is generated from the embedding 134 (Et) using the input text/using a transformer T. At an output-level, the embeddings ECi may be compared to the training data 108.

The adjusted attribution 126 enables the user 132 (e.g., secondary creator) to re-adjust the generative process by specifying a desired degree of influence for each content item, creator, pool, category in the training data 108 that was used to train the generative AI 114 when creating the output 118. This enables the user 132 to "edit" the output 118 by repeatedly adjusting the content used to create the output 118. For example, the user 132 may adjust the attribution by increasing the influence of creator 102(N) and decreasing the influence of creator 102(1) in the output 118. Increasing creator 102(N) results in instructing the generative AI 114 to increase an embedding of creator 102(N) in the output 118, resulting in the output 118 having a greater attribution to creator 102(N).

The output-based attribution 124 creates an output-based attribution vector 136, e.g., for style transfer synthesis and for using the content and style images to adjust the attribution vector, e.g., by increasing the element in the attribution vector corresponding to the creator 102 who created the style images. The degree of influence for the generative AI 114 may also be manually adjusted, as described herein, using the adjusted attribution 126. The embedding 134 may include information identifying (1) one of more of the content creators 102 whose content items 104 are included in the output 118, (2) one or more of the content items 104 included in the output 118, (3) one or more of the categories 138 included in the output 118, or (4) any combination thereof. The output-based attribution 124 may use the embedding 134 to create the attribution vector 136.

Output-based attribution 124 may be performed (i) by comparing creator embeddings of individual creators 102 to the embedding 134 (e.g., where the embedding 134 identifies individual creators 102 used to create the output 118) to determine the attribution vector 136, (ii) by comparing embeddings of the content items 104 with the embedding 134 (e.g., where the embedding 134 identifies individual content items 104 used to create the output 118) to determine the attribution vector 136, (iii) by comparing content embeddings of characteristics of the content items 104 with the embedding 134 (e.g., where the embedding 134 identifies characteristics of individual creators 102 used to create the output 118) to determine the attribution vector 136, or (iv) any combination thereof. For example, the embedding 134 may identify: (i) the individual creators 102 whose content items were used to create the output 118, (ii) the content items 104 used to create the output 118, (iii) categories (e.g., characteristics), or (iv) any combination thereof.

Thus, an AI may be trained using content to create a generative AI capable of generating derivative content based on the training content. The user (e.g., derivative content creator) may provide input, in the form of a description describing the desired output, to the generative AI. The generative AI may use the input to generate an output that includes derivative content derived from the training content. When using output-based attribution, the output may be analyzed to identify the influence of one or more original content creators. An attribution determination module may use the output-based attribution to determine an attribution vector that indicates an amount of attribution for individual creators. For example, the attribution determination module may determine a distance measurement (also referred to as similarity or proximity) between an embedding associated with the output (produced by the generative AI) and (i) creator embeddings of individual creators, (ii) content embeddings of content items, (iii) content item embeddings of characteristics of content items, or (iv) any combination thereof. The distance (e.g., proximity) measurement may be used to determine the creator attribution.

Figure 2:
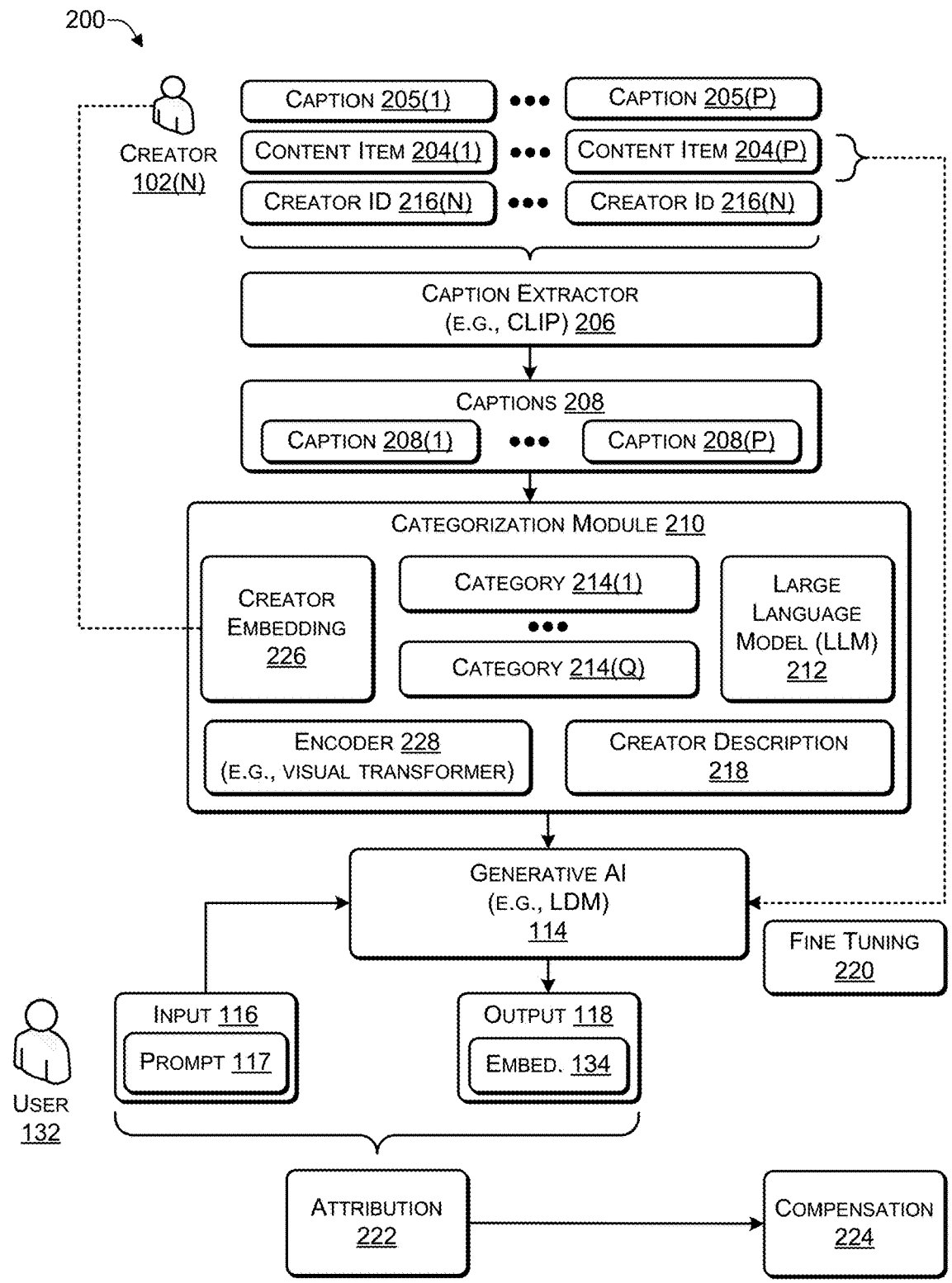
FIG. 2 is a block diagram of a system to train an artificial intelligence (AI) on a particular content creator, according to some embodiments.

FIG. 2 is a block diagram of a system 200 to train an artificial intelligence (AI) on a particular content creator, according to some embodiments. A creator 102(N) (N>0) may create one or more content items 204(1) to 204(P) (P>0) (e.g., a portion of the content items 104 of FIG. 1). The system 200 may be used to train the generative AI 114 to add (e.g., learn) the content items 204 associated with the creator 102(N). The system 200 may be used to train the generative AI 114 to add (learn) a new creator (e.g., content items 204 of the creator 102(N) were not previously used to train the generative AI 114) or add additional content items created by a creator. For example, assume the creator 102(N) creates a first set of content items during a first time period (e.g., Y years, Y>0). The generative AI 114 is trained using the first set of content items to add the creator 102(N). Subsequently, the creator 102(N) creates a second set of content items. The generative AI 114 may be trained using the second set of content items to update the knowledge associated with the creator 102(N).

In some cases, the content items 204 may have associated captions 205 that describe individual content items. For example, caption 205(1) may be a caption that describes the content item 204(1) and caption 205(P) may be a caption that describes the content item 204(P). If one or more of the content items 204 do not have an associated caption 205 or to supplement the caption 205, a caption extractor 206 may be used to create captions 208, where caption 208(1) describes content item 204(1) and caption 208(P) describes content item 204(P). The caption extractor 206 may be implemented using, for example, a neural network (or another type of AI) such as Contrastive Language Image Pre-training (CLIP), which efficiently learns visual concepts from natural language supervision. CLIP may be applied to visual classification, such as art, images (e.g., photos), video, or the like. The captions 208 produced by the caption extractor 206 may be text-based. In some cases, such as with audio, text, or both, the caption extractor 206 may be implemented using a neural network (or another type of AI), such as Contrastive Language-Audio Pretraining (CLAP) or similar.

A unique identifier (id) 216 may be assigned to each content item 204 associated with individual creators. A unique id 216(N) may be associated with each of the content items 204 associated with the creator 102(N). For example, the unique id 216(N) may be associated with each of the content items 204 using Dreambooth (a deep learning generative model used to fine-tune text-to-image models). The caption extractor 206 may be used to create a caption 208 for each content item 204 if one or more if the content items 204 do not have an associated caption 205 or to supplement the caption 205.

The categorization module 210 is used to identify categories 214(1) to 214(Q) based on the captions 205, 208 associated with each content item. For example, a visual image of a dog and a cat on a sofa may result in the captions "dog", "cat", "sofa". The categorization module 210 may use a large language model 212 to categorize the captions 208. For example, dog and cat may be placed in an animal category 214 and sofa may be placed in a furniture category 214. In this way, the categorization module 210 may create a creator description 218 associated with the unique identifier 216. The creator description 218 may describe the type of content items 204 produced by the creator 202. For example, the categorization module 210 may determine that the creator 202 creates images (e.g., photos or artwork) that include animals and furniture and indicate this information in the creator description 218.

For example, the creator embedding 226 may be viewed as an embedding point $E_{Ai}$ that represents the content items 204 created by artist $A_i$ (e.g., creator 102(N)) and what the generative AP 114 learns from the captions 208. The creator embedding 226 is created using an encoder 228 using an encoding technique, such as a visual transformers, denoted ViT. The generative AI 114 (e.g., $SD_{TUNED}$) may generate output 118 (e.g., an image $I_p$) based on prompt 117 (e.g., prompt p) provided by the user 132. To determine the attribution 222, the distance (e.g., distance $d_1$) of the embedding 134 (e.g., embedding $E_{Ip}$ of the image $I_p$) to the creator embedding 226 (e.g., $E_{A1}$).

The generative AI 114 may use the prompt 117 to produce the output 118. The output 118 may be compared with the creator embedding 226, the categories 214 associated with the creator 102(N), the content items 204, or any combination thereof. In some cases, fine tuning 220 may be performed to further improve the output of the generated AI 114 to enable the output 118 to closely resemble one or more of the content items 204. An attribution module 222, such as the input-based attribution 120, the model-based attribution 122, the output-based attribution 124, the adjusted attribution 126 or any combination thereof, may be used to determine the attribution and provide compensation 224 to the creator 202.

Thus, an AI may be trained on a particular creator by taking content items created by the particular creator, analyzing the content items to extract captions, and using a categorization module to categorize the captions into multiple categories, using a large language model. The particular creator may be assigned a unique creator identifier and the unique creator identifier may be associated with individual content items associated with the particular creator. The output of the generative AI may be fine-tuned to enable the generative AI to produce output that more closely resembles (e.g., has a greater proximity to) the content items produced by the particular creator.

Figure 3:
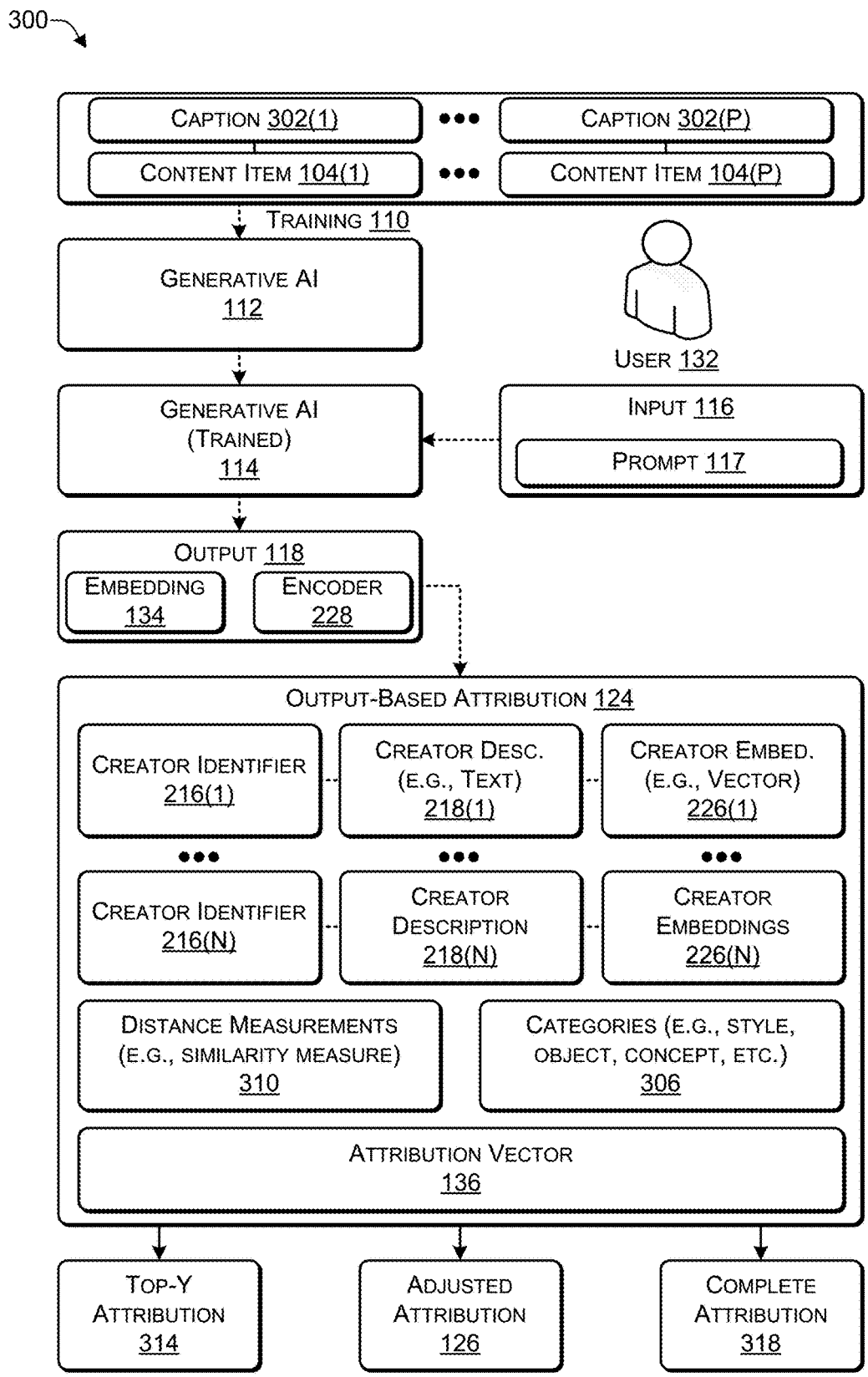
FIG. 3 is a block diagram of a system to create an attribution vector, according to some embodiments.

FIG. 3 is a block diagram of a system 300 to create an attribution vector, according to some embodiments. The output-based attribution 124 may create the attribution vector 136 based on the output 118 (e.g., derivative content) that was generated in response to the user 132 providing the input 116. The attribution vector 136 specifies an amount (e.g., a percentage or another type of measurement) of influence each content item, creator, pool, category, and the like has on the output 118. Output-based attribution 124 may be performed using one or more of the following techniques: (1) creator-based attribution that determines the creators that have influenced the output 118, (2) content-based attribution that determines the content items (and associated content creators) that have influenced the output 118, (3) category-based (e.g., characteristics-based) attribution that determines categories embedded in the output 118 and identifies the content creators associated with the categories, or (4) any combination thereof.

Each content item 104 may have an associated caption 302. For example, content item 104(1) may have an associated caption 302(1) and content item 104(P) may have an associated caption 302(P). Each caption 302 may include (i) the caption 205 (e.g., description) provided by the creator 102 that created the content item 104, (ii) the caption 208 created by the caption extractor 206 of FIG. 2, or both.

The output-based attribution 124 determines an output-based attribution vector 136 for the output 118. The attribution vector 136 specifies a percentage of influence that each image, creator, pool, category, or the like had in the creation of the output 118 created by the generative AI 114 based on the input 116.

Each of the creators 102 of FIG. 1 may have an associated creator identifier 216, a text-based creator description 218, and a vector-based (or matrix-based) creator embedding 226. In some cases, the output-based attribution 124 may determine categories 306 (e.g., characteristics) associated with the training data 108 and analyze the embedding 134 to identify which of the categories 306 are present. The output-based attribution 124 may determine distance measurements 310 between the embedding 134 and the categories 306, between the embedding 134 and the individual creator embeddings 226, or both. There are several types of creator-based attribution that may be determined: Top-Y attribution 314, adjusted attribution 126, complete attribution 318, or any combination thereof.

For top-Y attribution 314, the output-based attribution 124 determines an influence of the top Y (Y>0) contributors (content creators) to the output 118. In some cases, the top Y may be a predetermined number, such as top 5, top 10, or the like. In other cases, the top Y may be contributors (content creators) whose influence is greater than a threshold amount (e.g., 10%, 5%, or the like). Note that when Y=1, single-creator attribution is determined, e.g., the output-based attribution 124 determines the influence of a single content creator on the output 118, e.g., the creator with the greatest influence on the output 118.

Adjusted attribution 126 determines the influence of a set of content creators on the output 118 after the user 132 has finished adjusting the influence to create the output 118. For example, the user 132 may select a set of content creators (creators 102 of FIG. 1) and then "mix" (e.g., adjust) substantially in real-time, the influence of individual content creators in the set of content creators, and views the resulting output (substantially in real-time) until the output 118 satisfies the user 132. To illustrate, the user 132 may select a set of creators (e.g., Rembrandt, Degas, Dali, and Vermeer) and adjust, substantially in real-time, an amount of influence of each creator on the resulting output 118 until the user 132 is satisfied with the output 118. The adjusted attribution 126 may determine individual percentages of influence associated with each of the selected creators, with each percentage ranging from 0% to 100%.

For complete attribution 318, the output-based attribution 124 determines an influence of content items 104 used in the training data 108 (of FIG. 1) on the output 118. For example, the AI 112 may be pre-trained using open-source datasets. The AI 112 is then fine-tuned using the content items 104 associated with the creators 102 to create the generative AI 114. If the content items 104 have captions describing them, then a unique creator identifier 216 may be added to each caption to identify the creator 102 of each content item 104. In some cases, a caption generated using CLIP may be added. The unique identifier may result in creator embeddings 226 $E_{Ai}$, which represents what the AI 114 knows about each creator $A_i$ on top of what the AI 114 already knows from the captions associated with the content items 104. The creator embeddings 226 may be created using encoding techniques, such as visual transformers, denoted ViT. The generative AI 114 may be used to generate a content item (e.g., image $I_p$) using a prompt p (prompt 117). To determine the attribution of each creator (e.g., creators $A_1$ and $A_2$), the output-based attribution 124 determines a distance measurement 310 of the content embedding $E_{Ip}$ (e.g., of an image $I_p$) to creator embeddings (e.g., $E_{A1}$ and $E_{A2}$). For example, for two creators, distances $d_1$ and $d_2$ are the attribution values used to create the attribution vector 136 of output 118 (e.g., image $I_p$).

In this way, the output to a generative AI is analyzed to identify categories (e.g., characteristics) included in the output. For example, the categories may be broader than what was identified in the output, such as a category "animal" (rather than cat, dog, or the like in the output), a category "furniture" (rather than sofa, chair, table, or the like in the output), a category "jewelry" (rather than earring, necklace, bracelet, or the like in the output) and so on. Each creator has a corresponding description that includes categories (also referred to as creator categories) associated with the content items created by each creator. For example, a creator who creates a painting of a girl with a necklace may have a description that includes categories such as "jewelry", "girl", "adolescent", "female", or the like. The creator categories may include the type of media used by each creator. For example, for art, the categories may include pencil drawings (color or monochrome), oil painting, watercolor painting, charcoal drawing, mixed media painting, and so on. The output-based attribution compares the categories identified in the output with the categories associated with each creator and determines a distance measurement for each category. The distance measurements are then used to create an attribution vector that identifies an amount of attribution for each creator based on the analysis of the output.

Figure 4:
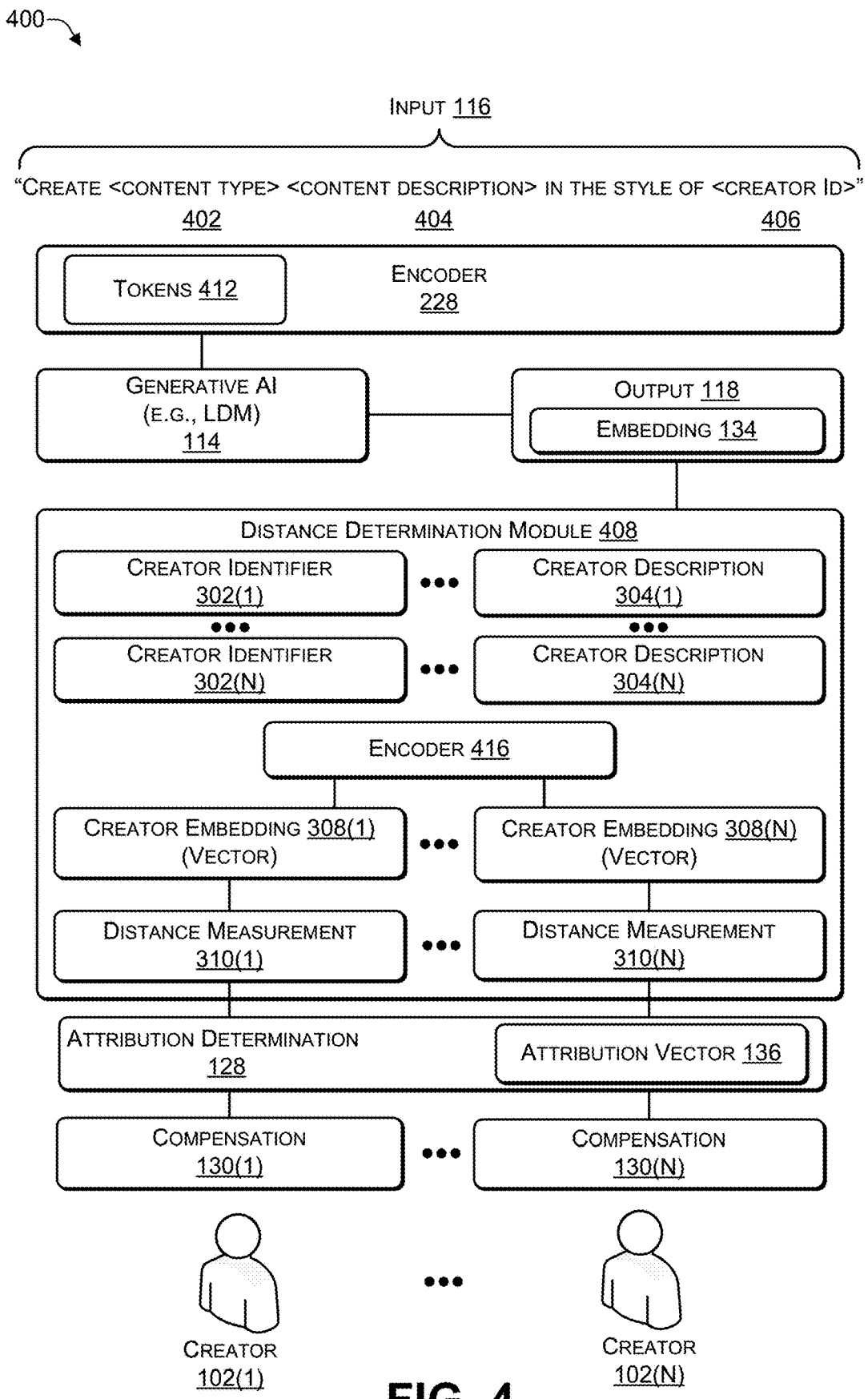
FIG. 4 is a block diagram of a system to perform output-based attribution based on creator embeddings, according to some embodiments.

FIG. 4 is a block diagram of a system 400 to perform output-based attribution based on creator embeddings, according to some embodiments. The system 400 describes components of the output-based attribution (module) 124 of FIGS. 1, 2, and 3.

Creator identifiers (e.g., creator names) 302(1) to 302(N) correspond to creators 102(1) to 102(N), respectively. If the system 400 determines that a particular creator 102(X) (0<X<=N) of the creators 102 is identified in the embedding 134, then the particular creator 102(X) may be added to the attribution vector 136. For example, if the embedding 134 includes the creator identifiers "Dali" and "Picasso" then both creators may be added to the attribution vector 136. The system 400 may determine the embedding 134 corresponding to the output 118. A distance determination module 408 may compare the embedding 134 (Et) to creator embeddings 308(1) to 308(N) (e.g., ECi) to determine a distance (e.g., proximity) of the output 118 to individual creators 102. The distance determination module 408 determines a distance (e.g., proximity) using a similarity measure Di, such as a cosine similarity, an Orchini similarity, a Tucker coefficient of congruence, a Jaccard index, a Sorensen similarity index, contrastive learning (e.g., self-supervised learning), or another type of distance or similarity measure, to create distance measurements 310(1) to 310(N) corresponding to the creators 102(1) to 102(N), respectively.

The input 116 may include a prompt, e.g., create content type 402 having content description 404 in the style of creator identifier(s) 406. A caption is text that describes an existing image, whereas a prompt is text that specifies a desired, but currently non-existent image. For example, the text "create a painting of a woman in the style of Picasso and Dali" is a prompt, not a caption. To process the prompt (in the input 116), the text is converted into tokens 412 by an encoder, such as the encoder 228. This may be viewed as one stage in a complex image synthesis pipeline. The tokens 412 are an encoding (e.g., representation) of the text to make the input 116 processable by the generative AI 114. For example, the space between words can be a token, as can be a comma separating words. In a simple case, each word, each punctuation symbol, and each space may be assigned a token. However, a token can also refer to multiple words, or to multiple syllables within a word. There are many words in a language (e.g., English). By grouping the words together to create the tokens 412, the result, as compared to the text in the input 116, is relatively few tokens (e.g., compression) with a relatively high-level meaning. A caption, rather than a prompt, works the other way around. For example, given an image combining the paintings of two artists, an image embedding comprising a vector of numbers (e.g., 512 numbers) of the image may be decoded into the text "a painting of a woman in the style of Dali and Picasso". Converting an image into a vector of numbers and then converting those numbers back into text is referred to as caption extraction.

A creator embedding of Picasso (e.g., 308(P)) and a creator embedding of Dali (e.g., 308(D)) are each vectors of numbers. Each creator embedding 308 may be created as follows. First, images of paintings painted by a creator (e.g., Picasso) are obtained and supplied to encoder 416, with each image having a caption that includes "a painting by Picasso". The encoder 416 turns both the painting and the associated caption into a vector of numbers, e.g., the creator embedding 308(P) associated creator Picasso. During the training phase 101 of FIG. 1, the generative AI 114 (e.g., Stable Diffusion) learns to properly reconstruct an image using a vector of numbers. By causing the generative AI 114 to reconstruct many (e.g., dozens, hundreds, or thousands) of images of Picasso paintings using just the vector of numbers (e.g., 512 numbers) derived from text, the generative AI 114 learns to map the word "Picasso" in the text input to a certain style in the images (e.g., in the output 118) created by the generative AI 114. After the training phase 101 has been completed, the generative AI 114 knows what is meant when the input 116 includes the text "Picasso". From the training phase 101, the generative AI 114 knows exactly which numbers create the embedding 134 to enable generating any type of image in the style of Picasso. In this way, the creator embedding 308(P) associated with Picasso is a vector of numbers that represent the style of Picasso. A similar training process is performed for each creator, such as Dali.

Thus, each creator has a corresponding description that includes categories (also referred to as creator categories or creator characteristics) associated with the content items created by each creator. For example, a creator who creates a painting of a girl with a necklace may have a description that includes categories (characteristics) such as "jewelry", "girl", "adolescent", "female", or the like. The creator categories may include the type of media used by each creator. For example, for art, the categories may include pencil drawings (color or monochrome), oil painting, watercolor painting, charcoal drawing, mixed media painting, and so on. The distance determination module compares the categories identified in the output with the categories associated with each creator to determine a distance (e.g., similarity) measure for each category. The distance measurements are used to create an attribution vector that identifies an amount of attribution for each creator based on the analysis of the output.

Figure 5:
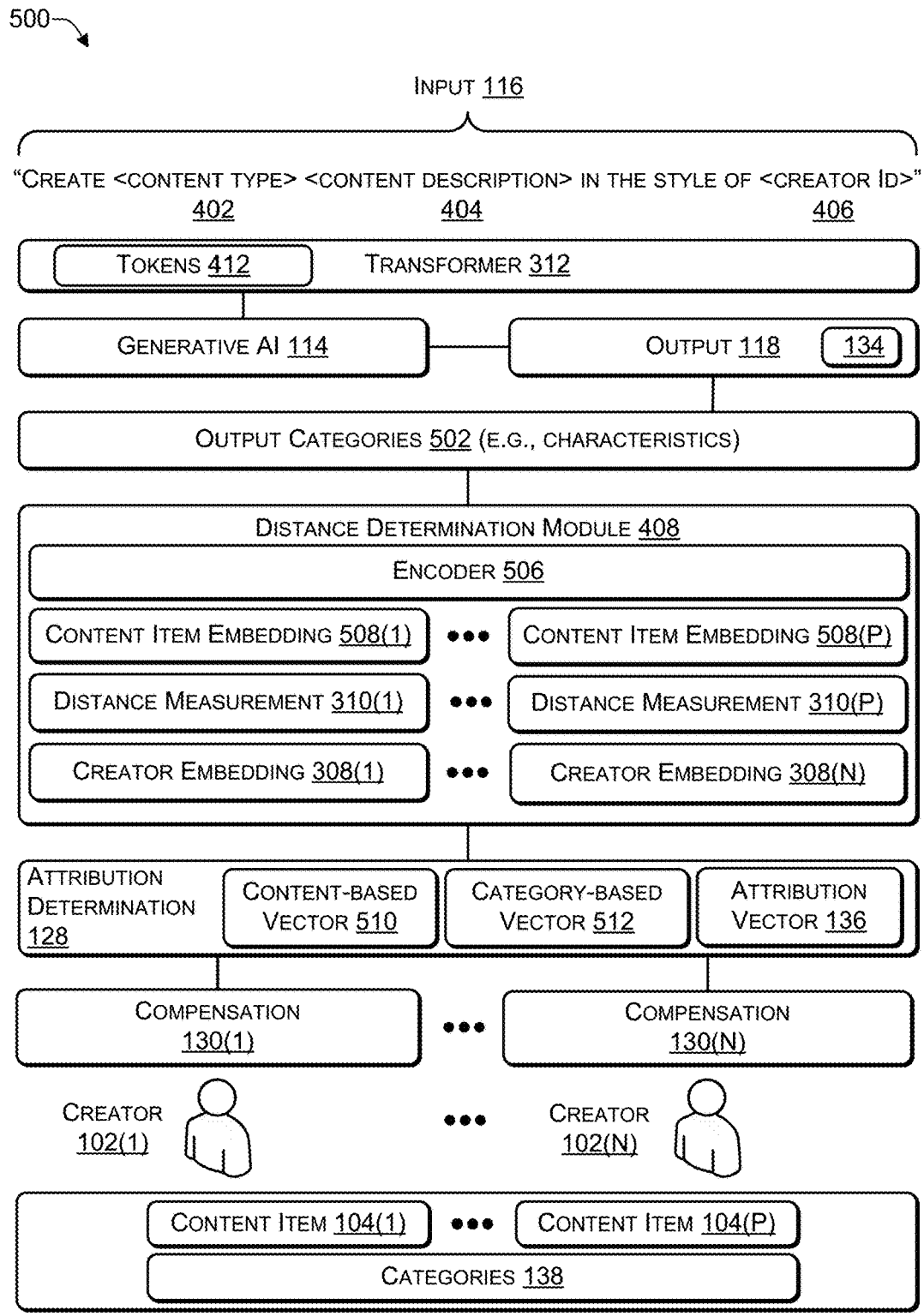
FIG. 5 is a block diagram of a system to perform output-based attribution, according to some embodiments.

FIG. 5 is a block diagram of a system 500 to perform output-based attribution, according to some embodiments. The attribution vector 136 may be created based on determining a similarity (i) between content items 104 of FIG. 1 and the output 118, (ii) between categories 502 (e.g., characteristics) of the output 118 and the categories of each of the content items 104, (iii) between creator embeddings and the output 118 (e.g., as described in FIG. 4), or (iv) any combination thereof.

The system 500 may determine the attribution vector 136 based on the influence of each content item 104 in the training data 108 on the output 118. For example, for content items 104(1) to 104(P), the system 500 may use an encoder 506 (e.g., a visual transformer or similar) to determine a content item embedding 508(1) to 508(P), respectively. The distance determination module 408 may determine a distance (e.g., proximity) between (i) the content item embedding 508 of the output 118 (e.g., image $I_p$) to (ii) each content item embedding 508(1) to 508(P) to create distance measurements 310(1) to 310(P), respectively. The distance measurements 310 may be used to create a content-based attribution vector 510. The system 500 may sum the attribution of the content items 104 of individual content creators 102 to determine the attribution vector 136.

The system 500 may determine the attribution vector 136 based on the influence of output categories 502 (characteristics) of the output 118 with categories included in the content items 104 (in the training data 108). Based on receiving input 116 (e.g., prompt p), the generative AI 114 (e.g., an AI model SD) creates the output 118 (e.g., an image I). The output-based attribution 124 of FIGS. 1, 2, and 3 may be determined for each of the output categories 502. For example, the output 118 may be influenced by (1) the subject (e.g., human portrait) associated with creator 102(1), (2) the artistic medium (e.g., watercolor) associated with creator 102(2), and (3) the mood (e.g., lightning storm) associated with creator 102(3). Using the output categories 502, the system 500 may determine a category-based vector 512. The system 500 may use the category-based vector 512 to create the attribution vector 136, thereby enabling a more fine-grained assessment of artistic attribution as the category-based vector 512 (and attribution vector 136) takes into account various characteristics of the output 118.

The category-based vector 512 may be determined as follows. The content items 104 may be analyzed to identify the categories 138 of FIG. 1 (e.g., characteristics) associated with the training data 108, such as, for example, content (e.g., human portrait, animal portrait, portrait of human with animal, or the like), medium (e.g., oil, watercolor, or the like), style (e.g., renaissance, impressionist, modern, or the like), place (e.g., country, city, ocean, river, lake, or the like), mood (e.g., bright, happy, dark, sad, moody, pain, pleasure, or the like), and the like. The system 500 may create a content item embedding 508 of a text description of each content item 104 in each of the categories 504. For a particular creator 102(N), the system 500 may use either the creator embedding 308(N) or an average of all embeddings of all content 102 associated with the particular creator 102(N) as a proxy for the creator embedding. The system 500 may determine the distance (e.g., proximity) measurements 310 between individual creator embeddings 308 relative all members of each category 504. For the output 118, the system 500 may determine the distance of the embedding 134 to each of the categories 502. The system 500 may compare the two previously determined distances to determine an amount of the influence of each creator 102 on the output 118. For example, when the category-based distances are relatively small (e.g., relatively close proximity), the creator's influence is relatively large and therefore the creator may receive a relatively large amount of attribution in the attribution vector 136. When the category-based distances are relatively large (e.g., relatively far, not very similar), the creator's influence is relatively small and therefore the creator may receive a relatively small (or zero) amount of attribution in the attribution vector 136.

In the flow diagram of FIGS. 6, 7, 8, and 9, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 600, 700, 800, and 900 are described with reference to FIGS. 1, 2, 3, 4, and 5 as described above, although other models, frameworks, systems and environments may be used to implement these processes.

Figure 6:
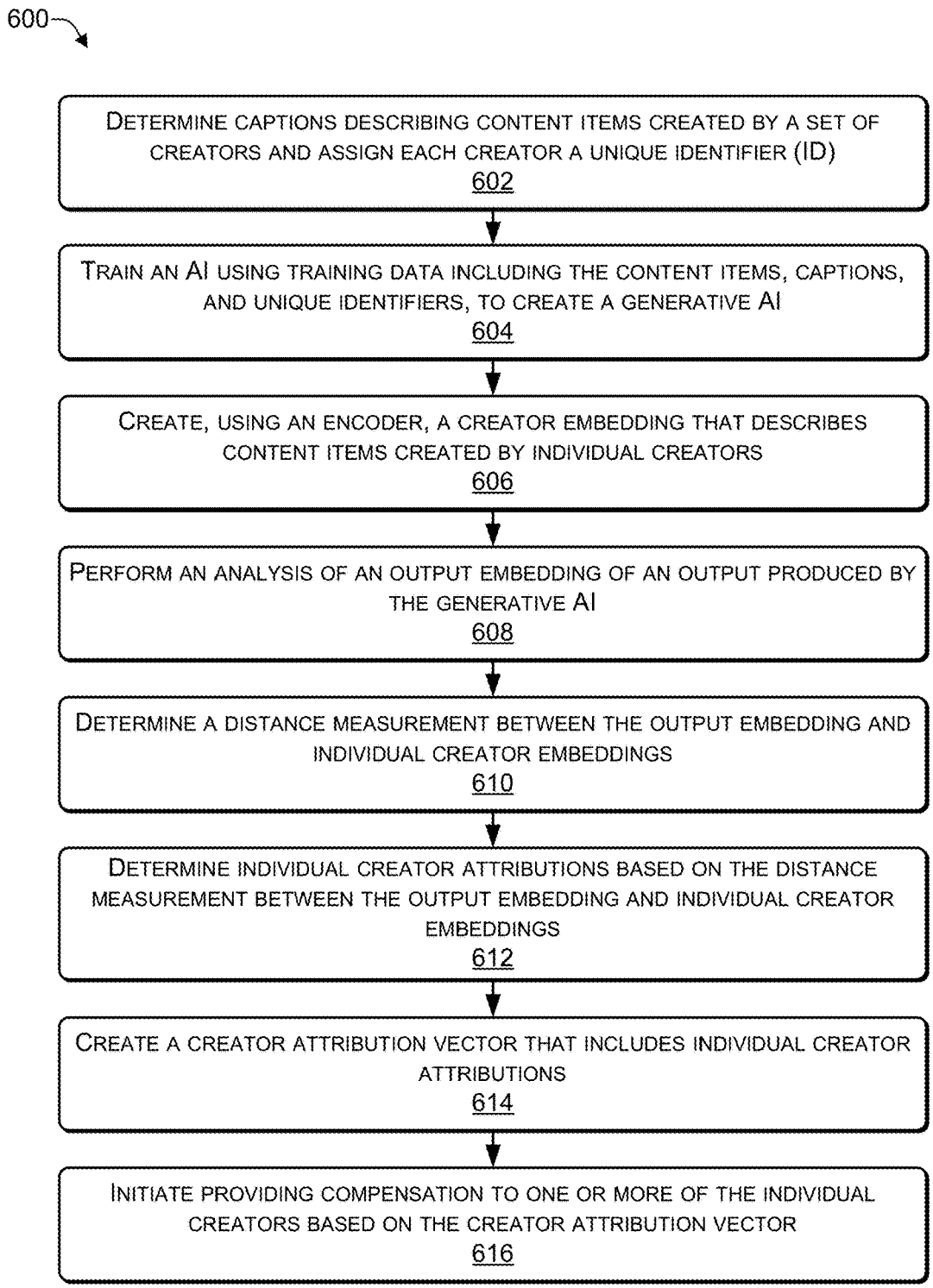
FIG. 6 is a flowchart of a process that includes determining a distance measurement between an output embedding and individual creator embeddings, according to some embodiments.

FIG. 6 is a flowchart of a process 600 that includes determining a distance measurement between an output embedding and individual creator embeddings, according to some embodiments. The process may be performed by the output-based attribution module 124, the attribution determination module 128, one or more components of the system 400 of FIG. 4, or any combination thereof. A creator embedding associated with each creator may be created and compared to an output embedding identifying creators to determine attribution.

At 602, the process may determine captions describing content items created by a set of creators and assign each creator a unique identifier. For example, in FIG. 2, if available, captions 205 associated with individual content items 204 may be determined. In some cases (e.g., in the absence of captions 205 or to augment the captions 205), a caption extractor, such as CLIP 206, may be used to create captions 208.

At 604, the process may train an AI using training data including the content items, the captions, and the unique identifiers, to create a generative AI. For example, in FIGS. 1 and 2, the AI 112 may be trained using the training data 108, including the content items 204, the unique identifier 216, and the captions 205, 208, to create the generative AI 114.

At 606, the process may create, using an encoder, a creator embedding that describes content items created by individual creators. For example, in FIG. 2, the encoder 228 may be used to create the creator embedding 226 associated with individual creators 102.

At 608, the process may perform an analysis of an output embedding of an output produced by the generative AI. At 610, the process may determine the distance measurement between the output embedding and individual creator embeddings. At 612, the process may determine individual creator attribution is based on the distance measurement between the output embedding and individual creator embeddings. At 614, the process may create a creator attribution vector that includes individual creator attributions. At 616, the process may initiate providing compensation to one or more of the individual creators based on the creator attribution vector. For example, in FIG. 2, the categorization module 210 may perform an analysis of the output 118, including the embedding 134. In FIG. 3, the output-based attribution 124 may determine the distance measurements 310 between the output embedding 134 and individual creator embeddings 226. The output-based attribution 124 may create the attribution vector 136 based on the distance measurements 310. In FIG. 4, the system 400 may initiate providing the compensation 132 individual creators 102 based on the attribution vector 136.

Thus, the embedding associated with the output of a generative AI may be analyzed to identify creators that have influenced the output. The output embedding may be compared with individual creator embeddings to determine a distance between the individual creator embeddings and the output embedding. The attribution vector may be created based on the distance between the individual creator embeddings and the output embedding. The attribution vector may be used to provide compensation to those creators that influenced the output of the generative AI.

Figure 7:
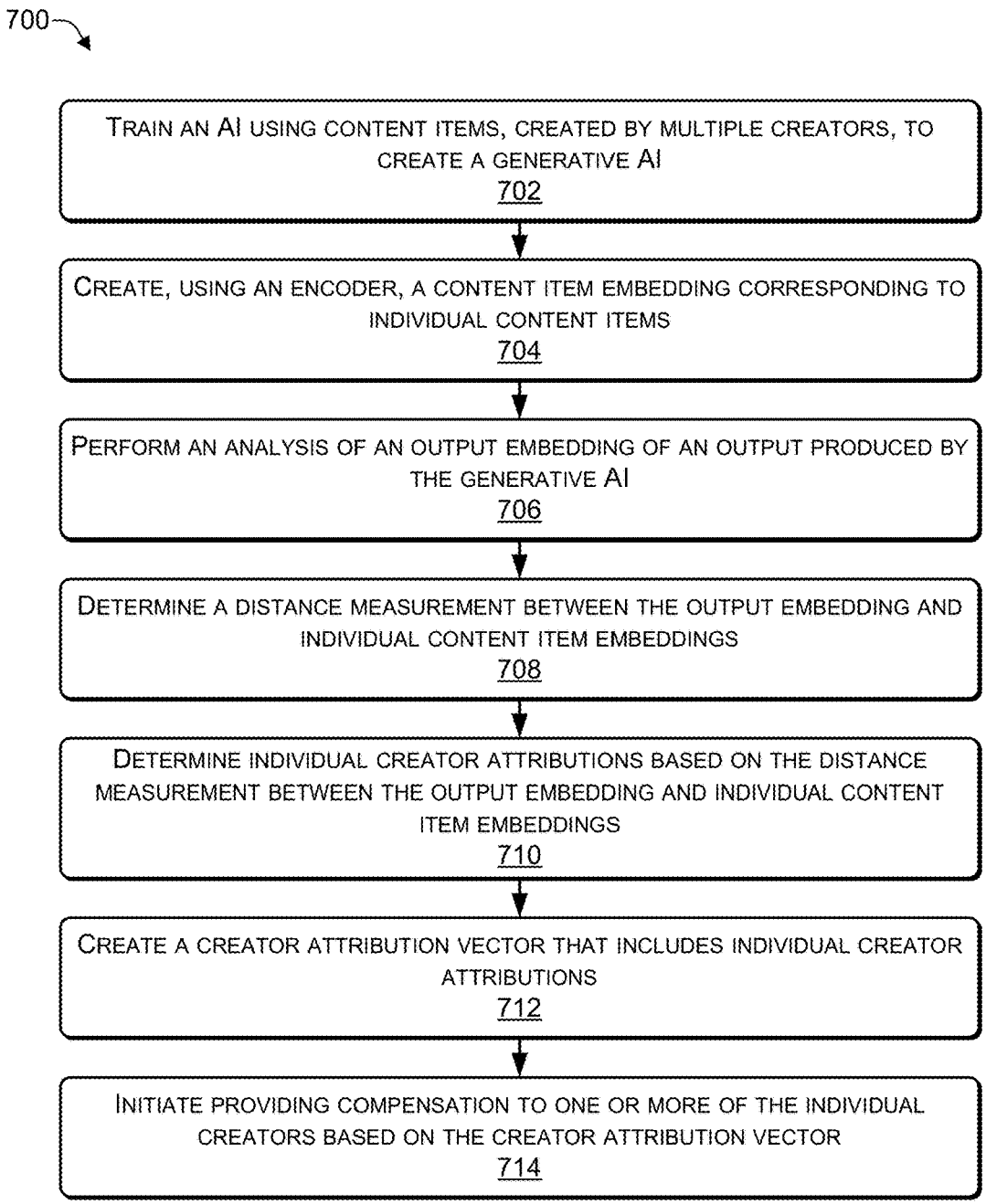
FIG. 7 is a flowchart of a process that includes determining a distance measurement between an output embedding and individual content item embeddings, according to some embodiments.

FIG. 7 is a flowchart of a process 700 that includes determining a distance measurement between an output embedding and individual content item embeddings, according to some embodiments. For example, the process may be performed by one or more components of the system 500 of FIG. 5. A content item embedding associated with each content item may be created and compared to an output embedding identifying content items to determine attribution.

At 702, the process may train an AI using content items, created by multiple creators, to create a generative AI. For example, in FIG. 1, the training phase 101 may use training data 108 (e.g., that includes content items 104 created by creators 102) to train the AI 112 to create the generative AI 114. The AI 112 may be a pre-trained AI model that has been pre-trained using, for example, open source data sets and the like. The training phase 101 may fine-tune the AI 112 to generate a particular type of content, such as artwork, photographs, music, books, or the like.

At 704, the process may create, using an encoder, a content item embedding corresponding to individual content items. For example, in FIG. 5, the system 500 may create the content embedding 508(1) to 508(P) corresponding to the content items 104(1) to 104(P).

At 706, the process may perform an analysis of an output embedding of an output produced by the generative AI. At 708, the process may determine the distance measurement between the output embedding and individual content item embeddings. At 710, the process may determine individual creator attributions based on the distance measurement between the output embedding an individual content item embeddings (e.g., based on identifying the individual creators that created the content items identified in the output embedding). At 712, the process may create a creator attribution vector that includes individual creator attributions. At 714, the process may initiate providing compensation to one or more of the individual creators based on the creator attribution vector. For example, in FIG. 5, the system 500 may perform an analysis of the embedding 134 of the output 118. The system 500 may determine the distance measurement 310 between individual ones of the content item embeddings 508 and the output embedding 134. The system 500 may create the attribution vector 136 based on the content-based vector 510. The system 500 may initiate providing the compensation 132 one or more of the creators 102.

Thus, the embedding associated with the output of a generative AI may be analyzed to identify content items that have influenced the output. For example, portions of the content items may have been incorporated, either with or without modification, into the output by the generative AI. The output embedding may be compared with individual content item embeddings to determine a distance between the individual content item embeddings and the output embedding. The attribution vector may be created based on the distance between the individual content item embeddings and the output embedding. The attribution vector may be used to provide compensation to those creators whose content items were the basis for generating the output produced by the generative AI.

Figure 8:
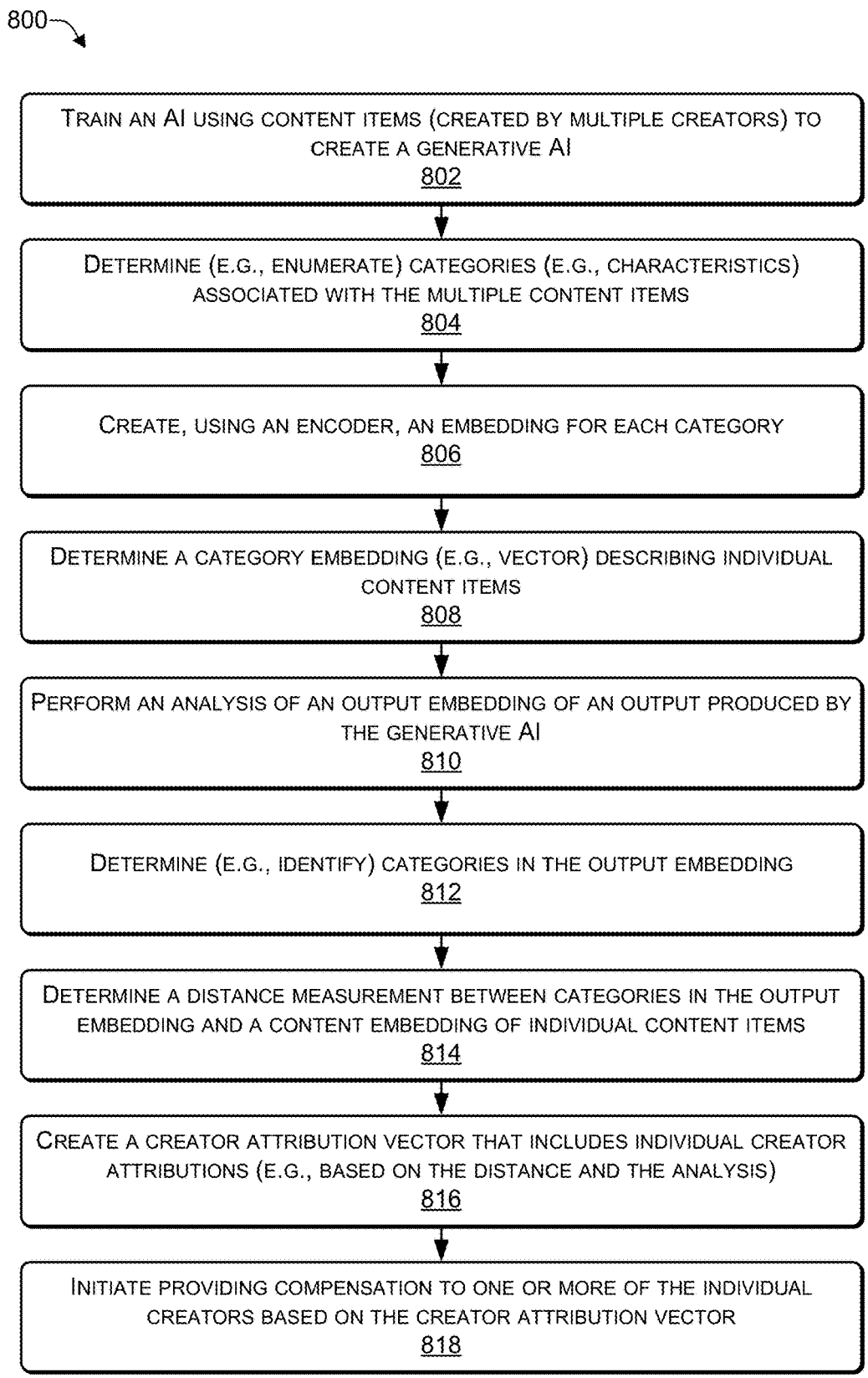
FIG. 8 is a flowchart of a process 800 that includes determining a distance measurement between an output embedding and content items based on categories (e.g., characteristics), according to some embodiments.

FIG. 8 is a flowchart of a process 800 that includes determining a distance measurement between an output embedding and content items based on categories (e.g., characteristics), according to some embodiments. For example, the process 800 may be performed by one or more components of the system 500 of FIG. 5. Categories in an output embedding may be compared with categories in content item embeddings to determine attribution.

At 802, the process may train an AI using content items (created by multiple creators) to create a generative AI. For example, in FIG. 1, the training phase 101 may use training data 108 (e.g., that includes content items 104 created by creators 102) to train the AI 112 to create the generative AI 114. The AI 112 may be a pre-trained AI model that has been pre-trained using, for example, open-source data sets and the like. The training phase 101 may fine-tune the AI 112 to generate a particular type of content, such as artwork, photographs, music, books, or the like.

At 804, the process may determine (e.g., identify or enumerate) categories (e.g., characteristics) associated with the multiple content items. For example, in FIG. 1, during the training phase 101, the training data 108 (e.g., the content items 104) may be analyzed to identify the categories 138 (e.g., characteristics) of the content items 104 in the training data 108.

At 806, the process may create, using an encoder, an embedding for each category. At 808, the process may determine a category vector describing individual content items. At 810, the process may perform an analysis of an output embedding of an output produced by the generative AI. At 812, the process may determine categories in the output embedding. At 814, the process may determine a distance measurement between categories in the output embedding and content items associated with individual creators. At 816, the process may create a creator attribution vector that in includes individual creator attributions based on the distance and the analysis. At 818, the process may initiate providing compensation to one or more of the individual creators based on the creator attribution vector. For example, in FIG. 5, the content items 104 may be analyzed to identify the categories 138 of FIG. 1 (e.g., characteristics) associated with the training data 108, such as, for example, content (e.g., human portrait, animal portrait, portrait of human with animal, or the like), medium (e.g., oil, watercolor, or the like), style (e.g., renaissance, impressionist, modern, or the like), place (e.g., country, city, ocean, river, lake, or the like), mood (e.g., bright, happy, dark, sad, moody, pain, pleasure, or the like), and the like. The system 500 may create a content item embedding 508 of a text description of each content item 104 in each of the categories 504. For a particular creator 102(N), the system 500 may use either the creator embedding 308(N) or an average of all embeddings of all content 102 associated with the particular creator 102(N) as a proxy for the creator embedding. The system 500 may determine the distance (e.g., proximity) measurements 310 between individual creator embeddings 308 relative all members of each category 504. For the output 118, the system 500 may determine the distance of the embedding 134 to each of the categories 502. The system 500 may compare the two previously determined distances to determine an amount of the influence of each creator 102 on the output 118. For example, when the category-based distances are relatively small (e.g., relatively close proximity), the creator's influence is relatively large and therefore the creator may receive a relatively large amount of attribution in the attribution vector 136. When the category-based distances are relatively large (e.g., relatively far, not very similar), the creator's influence is relatively small and therefore the creator may receive a relatively small (or zero) amount of attribution in the attribution vector 136.

Figure 9:
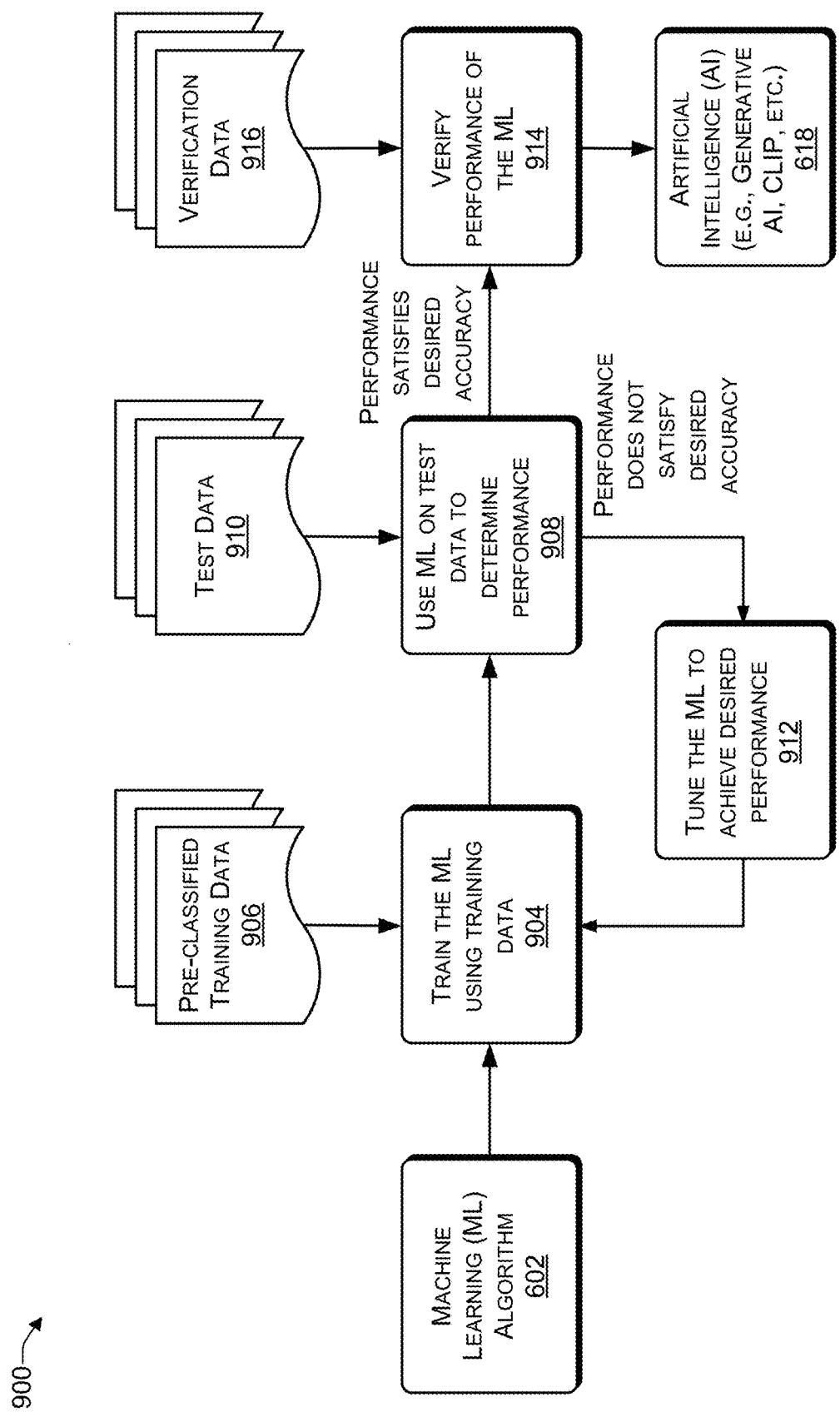
FIG. 9 is a flowchart of a process to train a machine learning algorithm, according to some embodiments.

FIG. 9 is a flowchart of a process 900 to train a machine learning algorithm, according to some embodiments. For example, the process 900 may be performed during the training phase 101 of FIG. 1.

At 902, a machine learning algorithm (e.g., software code) may be created by one or more software designers. For example, the generative AI 112 of FIGS. 1 and 3 may be created by software designers. At 904, the machine learning algorithm may be trained (e.g., fine-tuned) using pre-classified training data 906. For example, the training data 906 may have been pre-classified by humans, by machine learning, or a combination of both. After the machine learning has been trained using the pre-classified training data 906, the machine learning may be tested, at 908, using test data 910 to determine a performance metric of the machine learning. The performance metric may include, for example, precision, recall, Frechet Inception Distance (FID), or a more complex performance metric. For example, in the case of a classifier, the accuracy of the classification may be determined using the test data 910.

If the performance metric of the machine learning does not satisfy a desired measurement (e.g., 95%, 98%, 99% in the case of accuracy), at 908, then the machine learning code may be tuned, at 912, to achieve the desired performance measurement. For example, at 912, the software designers may modify the machine learning software code to improve the performance of the machine learning algorithm. After the machine learning has been tuned, at 912, the machine learning may be retrained, at 904, using the pre-classified training data 906. In this way, 904, 908, 912 may be repeated until the performance of the machine learning is able to satisfy the desired performance metric. For example, in the case of a classifier, the classifier may be tuned to classify the test data 910 with the desired accuracy.

After determining, at 908, that the performance of the machine learning satisfies the desired performance metric, the process may proceed to 914, where verification data 916 may be used to verify the performance of the machine learning. After the performance of the machine learning is verified, at 914, the machine learning 902, which has been trained to provide a particular level of performance may be used as an artificial intelligence (AI) 918. For example, the AI 918 may be the (trained) generative AI 114 of FIGS. 1, 2, 3, 4, and/or the caption extractor 206 (CLIP neural network) of FIG. 2.

Figure 10:
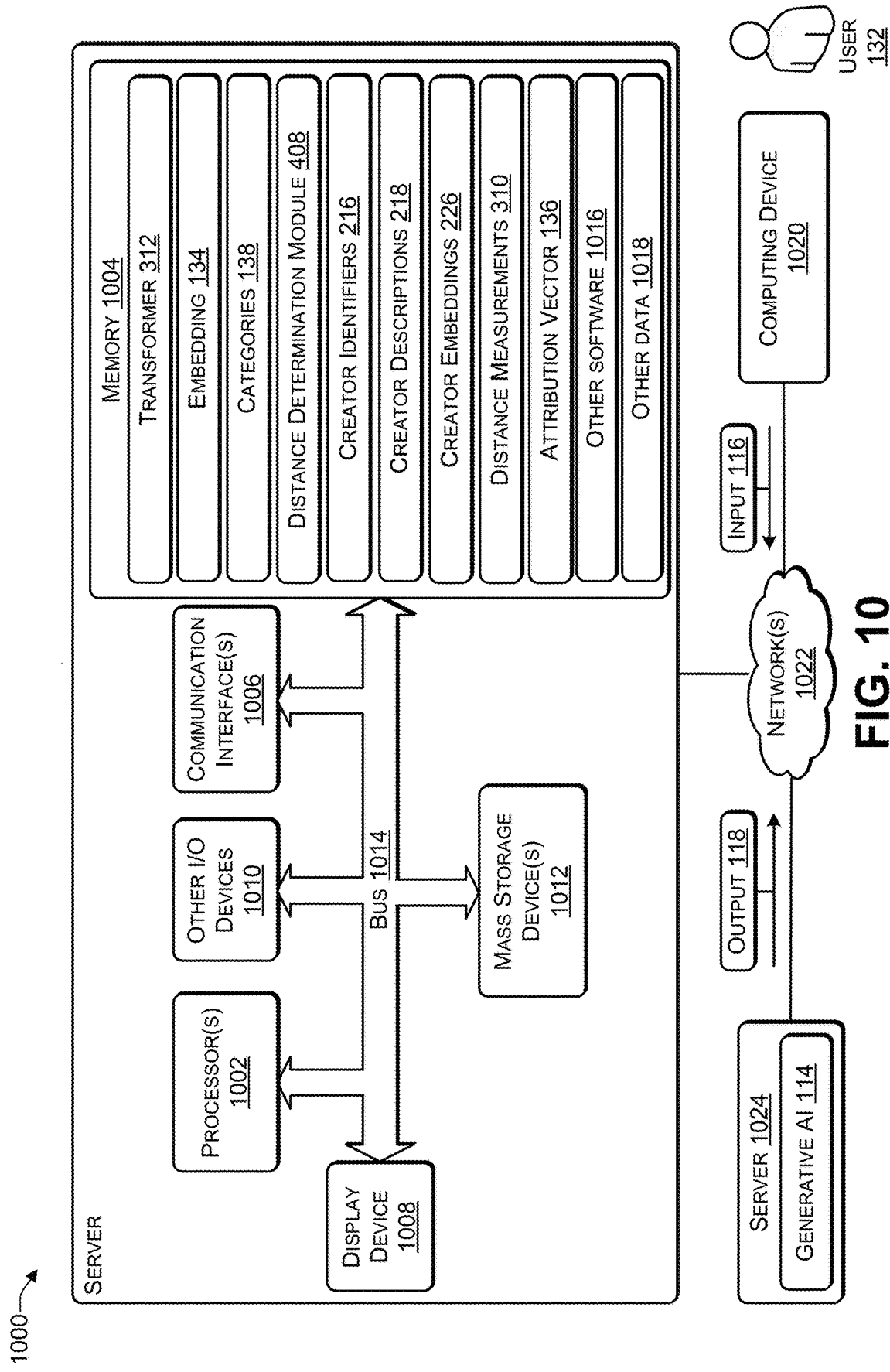
FIG. 10 illustrates an example configuration of a computing device that can be used to implement the systems and techniques described herein.

FIG. 10 illustrates an example configuration of a device 1000 that can be used to implement the systems and techniques described herein. For example, the device 1000 may be a server (or a set of servers) used to host one or more of the components described in FIGS. 1, 2, 3, 4, and 5. In some cases, the systems and techniques described herein may be implemented as an application programming interface (API), a plugin, or another type of implementation.

The device 1000 may include one or more processors 1002 (e.g., central processing unit (CPU), graphics processing unit (GPU), or the like), a memory 1004, communication interfaces 1006, a display device 1008, other input/output (I/O) devices 1010 (e.g., keyboard, trackball, and the like), and one or more mass storage devices 1012 (e.g., disk drive, solid state disk drive, or the like), configured to communicate with each other, such as via one or more system buses 1014 or other suitable connections. While a single system bus 1014 is illustrated for ease of understanding, it should be understood that the system bus 1014 may include multiple buses, such as a memory device bus, a storage device bus (e.g., serial ATA (SATA) and the like), data buses (e.g., universal serial bus (USB) and the like), video signal buses (e.g., ThunderBolt®, digital video interface (DVI), high definition media interface (HDMI), and the like), power buses, etc.

The processors 1002 are one or more hardware devices that may include a single processing unit or a number of processing units, all of which may include single or multiple computing units or multiple cores. The processors 1002 may include a graphics processing unit (GPU) that is integrated into the CPU or the GPU may be a separate processor device from the CPU. The processors 1002 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 1002 may be configured to fetch and execute computer-readable instructions stored in the memory 1004, mass storage devices 1012, or other computer-readable media.

Memory 1004 and mass storage devices 1012 are examples of computer storage media (e.g., memory storage devices) for storing instructions that can be executed by the processors 1002 to perform the various functions described herein. For example, memory 1004 may include both volatile memory and non-volatile memory (e.g., random access memory (RAM), read only memory (ROM), or the like) devices. Further, mass storage devices 1012 may include hard disk drives, solid-state drives, removable media, including external and removable drives, memory cards, flash memory, floppy disks, optical disks (e.g., compact disc (CD), digital versatile disc (DVD), a storage array, a network attached storage (NAS), a storage area network (SAN), or the like. Both memory 1004 and mass storage devices 1012 may be collectively referred to as memory or computer storage media herein and may be any type of non-transitory media capable of storing computer-readable, processor-executable program instructions as computer program code that can be executed by the processors 1002 as a particular machine configured for carrying out the operations and functions described in the implementations herein.

The device 1000 may include one or more communication interfaces 1006 for exchanging data via the network 110. The communication interfaces 1006 can facilitate communications within a wide variety of networks and protocol types, including wired networks (e.g., Ethernet, Data Over Cable Service Interface Specification (DOCSIS), digital subscriber line (DSL), Fiber, universal serial bus (USB) etc.) and wireless networks (e.g., wireless local area network (WLAN), global system for mobile (GSM), code division multiple access (CDMA), 802.11, Bluetooth, Wireless USB, ZigBee, cellular, satellite, etc.), the Internet and the like. Communication interfaces 1006 can also provide communication with external storage, such as a storage array, network attached storage, storage area network, cloud storage, or the like.

The display device 1008 may be used for displaying content (e.g., information and images) to users. Other I/O devices 1010 may be devices that receive various inputs from a user and provide various outputs to the user, and may include a keyboard, a touchpad, a mouse, a gaming controller (e.g., joystick, steering controller, accelerator pedal, brake pedal controller, virtual reality (VR) headset, VR glove, or the like), a printer, audio input/output devices, and so forth.

The computer storage media, such as memory 1004 and mass storage devices 1012, may be used to store any of the software and data described herein, including, for example, the transformer 312, the embedding 134, the categories 138, the distance determination module 408, the creator identifiers 216, the creator descriptions 218, the creator embeddings 226, the distance (e.g., proximity) measurements 310, the attribution vector 136, other software 1016, and other data 1018.

The user 132 (e.g., secondary creator) may use a computing device 1020 to provide the input 116, via one or more networks 1022, to a server 1024 that hosts the generative AI 114. Based on the input 116, the server 1024 may provide the output 118. The device 1000 may be used to implement the computing device 1020, the server 1024, or another device.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   determining, by one or more processors, a plurality of content creators that created multiple content items used as training data to train a generative artificial intelligence;
   performing, by the one or more processors and using a neural network, an analysis of a set of content items created by individual content creators of the plurality of content creators;
   determining, by the one or more processors and based on the analysis, a creator embedding for the individual creators of the plurality of content creators to create a plurality of creator embeddings, wherein creating the plurality of creator embeddings comprises:
      selecting a particular creator of the one or more content creators;
      performing, using the neural network, the analysis of a set of content items created by the particular creator, the neural network comprising a Contrastive Language-Image Pretraining (CLIP), a Contrastive Language-Audio Pretraining (CLAP), or any combination thereof;
      determining, based on the analysis, a plurality of captions describing the set of content items;
      creating, based on the plurality of captions, a particular creator description; and
      creating the creator embedding associated with the particular creator based on the particular creator description;
   determining, by the one or more processors, an output produced by a generative artificial intelligence that was trained using the multiple content items;
   determining, by the one or more processors, an output embedding associated with the output;
   determining, using an encoder, a plurality of content-related embeddings, individual content-related embeddings of the plurality of content-related embeddings associated with individual content items of the multiple content items;
   determining, by the one or more processors, a distance measurement between the output embedding and the individual content-related embeddings of the plurality of content-related embeddings to create a plurality of distance measurements;
   correlating, by the one or more processors, the plurality of distance measurements to the plurality of content creators based at least in part on the plurality of creator embeddings;
   determining, by the one or more processors and based on the correlating, one or more creator attributions, the individual creator attributions of the one or more creator attributions comprising a sum of an attribution of individual content items associated with the individual content creators;
   determining, by the one or more processors, a creator attribution vector that includes the one or more creator attributions based on identifying one or more of the creators that contributed at least a threshold amount, wherein a particular creator having a contribution less than the threshold amount does not receive a creator attribution; and
   initiating, by the one or more processors, providing compensation to one or more content creators of the plurality of content creators based on the creator attribution vector.

2. The method of claim 1, wherein the plurality of content-related embeddings comprise:
   a plurality of creator embeddings, wherein individual creator embeddings of the plurality of creator embeddings correspond to the individual content creators of the plurality of content creators.

3. The method of claim 1, wherein the output comprises:
   a digital image having an appearance of a work of art;
   a digital visual image;
   a digital text-based book;
   a digital music composition;
   a digital video; or
   any combination thereof.

4. The method of claim 1, wherein:
   the one or more creators comprise one or more artists;
   the one or more creators comprise one or more authors;
   the one or more creators comprise one or more musicians;
   the one or more creators comprise one or more visual content creators; or
   any combination thereof.

5. The method of claim 1, wherein determining the creator attribution vector comprises:
   determining the one or more creators that influenced the output;
   determining a portion of the multiple content items to determine the one or more content creators that influenced the output;
   determining one or more categories embedded in the output to identify the one or more content creators associated with the one or more categories; or
   any combination thereof.

6. The method of claim 1, wherein the distance measurement comprises:
   a cosine similarity,
   a contrastive learning encoding distance;
   a simple matching coefficient,
   a Hamming distance,
   a Jaccard index, an Orchini similarity,
a Sorensen-Dice coefficient,
a Tanimoto distance,
a Tucker coefficient of congruence,
a Tversky index, or
any combination thereof.

7. A server comprising:
one or more processors; and
a non-transitory memory device to store instructions executable by the one or more processors to perform operations comprising:
  determining a plurality of content creators that created multiple content items used as training data to train a generative artificial intelligence;
  performing, using a neural network, an analysis of a set of content items created by individual content creators of the plurality of content creators;
determining, based on the analysis, a creator embedding for the individual creators of the plurality of content creators to create a plurality of creator embeddings, wherein creating the plurality of creator embeddings comprises:
  selecting a particular creator of the one or more content creators;
  performing, using the neural network, the analysis of a set of content items created by the particular creator, the neural network comprising a Contrastive Language-Image Pretraining (CLIP), a Contrastive Language-Audio Pretraining (CLAP), or any combination thereof;
  determining, based on the analysis, a plurality of captions describing the set of content items;
  creating, based on the plurality of captions, a particular creator description; and
  creating the creator embedding associated with the particular creator based on the particular creator description;
determining an output produced by a generative artificial intelligence that was trained using the multiple content items;
determining an output embedding associated with the output;
determining, using an encoder, a plurality of content-related embeddings, individual content-related embeddings of the plurality of content-related embeddings associated with individual content items of the multiple content items;
determining a distance measurement between the output embedding and the individual content-related embeddings of the plurality of content-related embeddings to create a plurality of distance measurements;
correlating the plurality of distance measurements to the plurality of content creators based at least in part on the plurality of creator embeddings, individual creator attributions of the one or more creator attributions comprising a sum of an attribution of individual content items associated with the individual content creators;
determining, based on the correlating, one or more creator attributions;
determining a creator attribution vector that includes the one or more creator attributions based on identifying one or more of the creators that contributed at least a threshold amount, wherein a particular creator having a contribution less than the threshold amount does not receive a creator attribution; and
initiating providing compensation to one or more content creators of the plurality of content creators based on the creator attribution vector.

8. The server of claim 7, wherein the plurality of content-related embeddings comprise:
  a plurality of content item embeddings, wherein individual content item embeddings of the plurality of content item embeddings correspond to individual content items of the multiple content items.

9. The server of claim 7, wherein creating the output comprises:
  a digital image having an appearance of a work of art;
  a digital visual image;
  a digital text-based book;
  a digital music composition;
  a digital video; or
  any combination thereof.

10. The server of claim 7, wherein the generative artificial intelligence comprises:
  a latent diffusion model;
  a generative adversarial network;
  a generative pre-trained transformer;
  a variational autoencoder;
  a multimodal model; or
  any combination thereof.

11. The server of claim 7, wherein:
  the one or more content creators comprise one or more artists;
  the one or more content creators comprise one or more authors;
  the one or more content creators comprise one or more musicians;
  the one or more content creators comprise one or more songwriters;
  the one or more content creators comprise one or more visual content creators; or
  any combination thereof.

12. The server of claim 7, wherein the output produced by the generative artificial intelligence comprises:
  a digital image having an appearance of a work of art;
  a digital visual image;
  a digital text-based book;
  a digital music composition;
  a digital video; or
  any combination thereof.

13. The server of claim 7, wherein the distance measurement comprises:
  a cosine similarity,
  a contrastive learning encoding distance,
  a simple matching coefficient,
  a Hamming distance,
  a Jaccard index,
  an Orchini similarity,
  a Sorensen-Dice coefficient,
  a Tanimoto distance,
  Tucker coefficient of congruence,
  a Tversky index, or
  any combination thereof.

14. A non-transitory computer-readable memory device to store instructions executable by one or more processors to perform operations comprising:
  determining a plurality of content creators that created multiple content items used as training data to train a generative artificial intelligence;
  performing, using a neural network, an analysis of a set of content items created by individual content creators of the plurality of content creators;

determining, based on the analysis, a creator embedding for the individual creators of the plurality of content creators to create a plurality of creator embeddings, wherein
creating the plurality of creator embeddings comprises:
selecting a particular creator of the one or more content creators;
performing, using the neural network, the analysis of a set of content items created by the particular creator, the neural network comprising a Contrastive Language-Image Pretraining (CLIP), a Contrastive Language-Audio Pretraining (CLAP), or any combination thereof;
determining, based on the analysis, a plurality of captions describing the set of content items;
creating, based on the plurality of captions, a particular creator description; and
creating the creator embedding associated with the particular creator based on the particular creator description;
determining an output produced by a generative artificial intelligence that was trained using the multiple content items;
determining an output embedding associated with the output;
determining, using an encoder, a plurality of content-related embeddings, individual content-related embeddings of the plurality of content-related embeddings associated with individual content items of the multiple content items;
determining a distance measurement between the output embedding and the individual content-related embeddings of the plurality of content-related embeddings to create a plurality of distance measurements;
correlating the plurality of distance measurements to the plurality of content creators based at least in part on the plurality of creator embeddings;
determining, based on the correlating, one or more creator attributions, the individual creator attributions of the one or more creator attributions comprising a sum of an attribution of individual content items associated with the individual content creators;
determining a creator attribution vector that includes the one or more creator attributions based on identifying one or more of the creators that contributed at least a threshold amount, wherein a particular creator having a contribution less than the threshold amount does not receive a creator attribution; and
initiating providing compensation to one or more content creators of the plurality of content creators based on the creator attribution vector.

15. The non-transitory computer-readable memory device of claim 14, wherein the plurality of content-related embeddings comprise:
a plurality of category embeddings, wherein individual category embeddings of the plurality of category embeddings correspond to individual content items of the multiple content items.

16. The non-transitory computer-readable memory device of claim 14, further comprising:
determining, for individual content items of the multiple content items, a category embedding identifying one or more categories associated with individual content items.

17. The non-transitory computer-readable memory device of claim 14, wherein the generative artificial intelligence comprises:
a latent diffusion model;
a generative adversarial network;
a generative pre-trained transformer;
a variational autoencoder;
a multimodal model; or
any combination thereof.

18. The non-transitory computer-readable memory device of claim 14, wherein:
the content comprises a digital image having an appearance of a work of art and the one or more creators comprise one or more artists.

19. The non-transitory computer-readable memory device of claim 14, wherein:
the content comprises a digital book and the one or more creators comprise one or more authors.

20. The non-transitory computer-readable memory device of claim 14, wherein:
the content comprises a digital music composition and the one or more creators comprise one or more musicians, one or more songwriters, or any combination thereof.

* * * * *